(12) United States Patent
Adachi et al.

(10) Patent No.: US 11,512,182 B2
(45) Date of Patent: **\*Nov. 29, 2022**

(54) SOLAR RADIATION SHIELDING FINE PARTICLE DISPERSION BODY AND PROCESS FOR PRODUCING THE SAME, SOLAR RADIATION SHIELDING FINE PARTICLE-CONTAINING MASTERBATCH, AND SOLAR RADIATION SHIELDING RESIN FORMED BODY AND SOLAR RADIATION SHIELDING RESIN LAMINATE USING THE SAME

(71) Applicant: SUMITOMO METAL MINING CO., LTD., Tokyo (JP)

(72) Inventors: Kenji Adachi, Ichikawa (JP); Satoshi Yoshio, Tokyo (JP)

(73) Assignee: SUMITOMO METAL MINING CO., LTD., Tokyo (JP)

( \* ) Notice: Subject to any disclaimer, the term of this patent is extended or adjusted under 35 U.S.C. 154(b) by 430 days.

This patent is subject to a terminal disclaimer.

(21) Appl. No.: 16/647,674

(22) PCT Filed: Sep. 14, 2018

(86) PCT No.: PCT/JP2018/034226
§ 371 (c)(1),
(2) Date: Jun. 15, 2020

(87) PCT Pub. No.: WO2019/054493
PCT Pub. Date: Mar. 21, 2019

(65) Prior Publication Data
US 2020/0308369 A1   Oct. 1, 2020

(30) Foreign Application Priority Data
Sep. 15, 2017   (JP) .............................. JP2017-177883

(51) Int. Cl.
C08K 3/38   (2006.01)
C08K 9/02   (2006.01)
G02B 5/20   (2006.01)
C08J 3/22   (2006.01)

(52) U.S. Cl.
CPC ................. *C08K 9/02* (2013.01); *C08J 3/226* (2013.01); *C08K 3/38* (2013.01); *G02B 5/208* (2013.01);
(Continued)

(58) Field of Classification Search
CPC ...... C08K 3/38; C08K 9/02; C08K 2201/005; C08K 2201/011; G02B 5/208; C08J 3/226
See application file for complete search history.

(56) References Cited

U.S. PATENT DOCUMENTS 6,319,613 B1   11/2001   Takeda et al.
11,136,241 B2 \*   10/2021   Adachi .................. C08J 7/0427
(Continued)

FOREIGN PATENT DOCUMENTS

CN   104894641 A   9/2015
JP   2000-169765 A   6/2000
(Continued)

OTHER PUBLICATIONS

Lihong Bao, Xiaoping Qi, Tana Bao, O. Tegus, Structural, magnetic, and thermionic emission properties of multi-functional La1-xCaxB6 hexaboride, Journal of Alloys and Compounds 731 (2018) 332-338 (Year: 2018).\*

(Continued)

*Primary Examiner* — Bijan Ahvazi
(74) *Attorney, Agent, or Firm* — Oliff PLC

(57) ABSTRACT

A solar radiation shielding fine particle dispersion body containing a thermoplastic resin, solar radiation shielding fine particles, a solar radiation shielding fine particle-con-
(Continued)

taining masterbatch, a solar radiation shielding resin formed body formed into a predetermined shape using the same, and a solar radiation shielding resin laminate including the solar radiation shielding resin formed body stacked on another transparent formed body. A liquid solar radiation shielding fine particle dispersion body, including a mixture of solar radiation shielding fine particles and at least one selected from an organic solvent and a plasticizer dispersed therein or a solar radiation shielding fine particles including a powder solar radiation shielding fine particles dispersion body, obtained by removing a liquid component from the solar radiation fine particle dispersion body upon heating, dispersed in a resin component, wherein the solar radiation shielding fine particles are solar radiation shielding fine particles containing calcium lanthanum boride fine particles.

13 Claims, 1 Drawing Sheet

(52) U.S. Cl.
CPC .. *C08K 2201/005* (2013.01); *C08K 2201/011* (2013.01)

(56) References Cited

U.S. PATENT DOCUMENTS

| | | | |
|---|---|---|---|
| 11,235,558 B2 * | 2/2022 | Adachi | B32B 27/18 |
| 2004/0028920 A1 | 2/2004 | Fujita et al. | |
| 2004/0131845 A1 | 7/2004 | Fujita | |
| 2006/0009559 A1 | 1/2006 | Fujita et al. | |
| 2017/0283311 A1 | 10/2017 | Machida et al. | |

FOREIGN PATENT DOCUMENTS

| | | |
|---|---|---|
| JP | 2003-327717 A | 11/2003 |
| JP | 2004-59875 A | 2/2004 |
| JP | 4539824 B2 | 9/2010 |
| JP | 2018-141114 A | 9/2018 |
| WO | 2016/031969 A1 | 3/2016 |

OTHER PUBLICATIONS

Yoshio et al.; "Optical properties of group-3 metal hexaboride nanoparticles by first-principles calculations;" The Journal of Chemical Physics; 2016; pp. 234702-1-234702-11; vol. 144.

Machida et al.; "Particle shape inhomogeneity and plasmon-band broadening of solar-control LaB6 nanoparticles;" Journal of Applied Physics; 2015; pp. 013103-1-013103-10; vol. 118.

Nishikawa; "Powder or Boron Compound at Present;" Ceramics; 1987; pp. 40-45; vol. 22, No. 1.

DOI; "Lanthanum Hexa-Boride Powder-Properties and Preparation Method-;" Powder and Industry; 1989; pp. 66-70; vol. 21, No. 5.

Nov. 27, 2018 Search Report issued in International Patent Application No. PCT/JP2018/034226.

* cited by examiner

SOLAR RADIATION SHIELDING FINE PARTICLE DISPERSION BODY AND PROCESS FOR PRODUCING THE SAME, SOLAR RADIATION SHIELDING FINE PARTICLE-CONTAINING MASTERBATCH, AND SOLAR RADIATION SHIELDING RESIN FORMED BODY AND SOLAR RADIATION SHIELDING RESIN LAMINATE USING THE SAME

TECHNICAL FIELD

The present invention relates to a solar radiation shielding fine particle dispersion body containing solar radiation shielding fine particles and a thermoplastic resin and a method for producing the same, a solar radiation shielding fine particle-containing masterbatch, and a solar radiation shielding resin formed body, solar radiation shielding resin laminate using the same, which are applied, for example, to window materials for vehicles, buildings, general dwelling houses, and the like, and roof materials for arcade, dome, and the like.

DESCRIPTION OF RELATED ART

Openings such as windows and doors of various buildings and vehicles are made of a transparent glass plate or a resin plate to let sunlight in. However, sunlight includes ultraviolet and infrared radiations in addition to visible light. In particular, near-infrared radiations with wavelengths of 800 to 2500 nm among infrared radiations are called heat rays, which cause the increase in indoor temperature when they enter through such openings.

Recently, in the technical field relating to window materials of various buildings and vehicles, solar radiation shielding materials have been studied that shield heat radiations while sufficiently letting in visible light, thereby maintaining brightness and simultaneously suppressing an increase in indoor temperature, and various means therefor have been proposed.

The present applicants pay attention to the hexaboride fine particles having a large amount of free electrons as a component having solar radiation shielding effect, which is a measure for imparting solar radiation shielding effect to a transparent resin base material such as acrylic plates, polycarbonate plates, or the like. Patent Document 1 discloses a solar radiation shielding resin sheet material including hexaboride fine particles or hexaboride fine particles and ITO fine particles and/or ATO fine particles, dispersed in a polycarbonate resin or acrylic resin.

The optical properties of the solar radiation shielding resin sheet material to which hexaboride fine particles alone or hexaboride fine particles and the ITO fine particles and/or the ATO fine particles are applied have a local maximum of the visible light transmittance in the visible light region, and exhibit strong absorption and have a local minimum of the solar radiation transmittance in the near-infrared region. As a result, the solar radiation transmittance is improved to the 50% level while the visible light transmittance is 70% or more.

Further, in Patent Document 2, the present applicants disclosed application of a masterbatch containing heat ray shielding component including hexaboride fine particles dispersed in a thermoplastic resin such as acrylic resin, polycarbonate resin, polyetherimide resin, polystyrene resin, polyethersulfone resin, fluorine-based resin, polyolefin resin, polyester resin, or the like. As a result, a heat ray shielding transparent resin formed body and a heat ray shielding transparent laminate having a heat ray shielding function and a high transmission performance in the visible light region can be provided without using a high-cost physical film formation method or complicated steps. Furthermore, it is disclosed that a masterbatch containing a heat ray shielding component using boride fine particles surface-treated with at least one kind selected from a silane compound, a titanium compound, and a zirconia compound has an effect of further improving water resistance.

Furthermore, the present applicants found that hexaboride particles improves water resistance, dispersion property, transparency, infrared shielding property, and in particular, stable water resistance over a long period, when mixed in a raw material such as thermoplastic resin, thermosetting resin, elastomer, and fiber or when used after applied as a coating agent, a sealant, or the like onto a substrate, film, or the like for optical member application. Patent Document 3 discloses that the surface of hexaboride particles is covered with a silicone-based water-repellent treatment agent containing a reactant including a siloxane oligomer and an organosilicon compound containing an amino group, and the covered hexaboride particles are dispersed in a medium and used for manufacturing various optical members and films.

PRIOR ART DOCUMENT

Patent Document

[Patent Document 1] Japanese Patent Laid-Open Publication No. 2003-327717
[Patent Document 2] Japanese Patent Laid-Open Publication No. 2004-59875
[Patent Document 3] Japanese Patent No. 4539824

Non-Patent Document

[Non-Patent Document 1] Satoshi Yoshio, Koichiro Maki and Kenji Adachi, "Optical properties of group-3 metal hexaboride nanoparticles by first-principles calculations", J. Chem. Phys., Vol. 144, 234702 (2016)
[Non-patent document 2] K. Machida and K. Adachi, "Particle shape inhomogeneity and plasma band broadening of solar-control LaB6 nanoparticles", J. Appl. Phys., 118, 013103 (2015)
[Non-Patent Document 3] Ceramics, 22 volumes, 1987, pp 40-45 by Hiroshi Nishikawa
[Non-patent document 4] Powder and industry, 21 (5) 1989 by Doi

SUMMARY OF THE INVENTION

Problem to be Solved by the Invention

However, further investigation by the present inventors reveals that still higher solar shielding properties are required for the solar shielding transparent resin formed body, and green coloring in hexaboride fine particles constitutes one of the drawbacks. For example, there is still room for improvement in the solar radiation shielding sheet material, the heat ray shielding transparent resin formed body, and the heat ray shielding transparent laminate according to Patent Document 2.

For example, it has also been found that it may be difficult to uniformly disperse the covered hexaboride particles according to Patent Document 3 in various media used according to the use of the optical member or the film.

Furthermore, in order to obtain a covering effect, it is necessary to secure a sufficient covering layer thickness, and problems such as a reduction in the visible light transmission property of an optical member or film using the covered hexaboride particles has been found.

The present invention has been made while paying attention to such problems. An object of the present invention is to provide a solar radiation shielding fine particle dispersion body containing a thermoplastic resin and a solar radiation shielding fine particles having a high visible light transmission property and at the same time having an excellent heat ray shielding effect and stable weather resistance, and a method for production thereof, a masterbatch containing the solar radiation shielding fine particles and a solar radiation shielding resin formed body formed into a predetermined shape using the masterbatch, and a solar radiation shielding laminate in which the solar radiation shielding resin formed body is stacked on a separate transparent formed body.

Means for Solving the Problem

In order to solve the above-described problems, the present inventors have studied intensively. As a result, the present inventors found that fine particles of a predetermined shape which are calcium lanthanum boride fine particles represented by general formula $Ca_xLa_{1-x}B_m$ (satisfying $0.001 \leq x \leq 0.800$, $5.0 \leq m < 6.3$) have a strong heat ray absorbing effect and at the same time have a broad visible light transmission property and stable weather resistance. Thus, the present inventors have completed the present invention.

Namely, a first invention to solve the above-described problem is a liquid solar radiation shielding fine particle dispersion body, comprising:
  a mixture of at least one selected from an organic solvent and a plasticizer, and
  solar radiation shielding fine particles, which are dispersed therein, or
a solar radiation shielding fine particle dispersion body, comprising:
  a powder solar radiation shielding fine particle dispersion material, which is obtained by removing a liquid component from the solar radiation fine particle dispersion body with heating, and dispersed in a resin component,
  wherein the solar radiation shielding fine particles are solar radiation shielding fine particles containing calcium lanthanum boride fine particles represented by general formula $Ca_xLa_{1-x}B_m$, a value of x is in a range of $0.001 \leq x \leq 0.800$, and a value of m is in a range of $5.0 \leq m < 6.3$ in the general formula, an average dispersed particle size is 1 nm or more and 800 nm or less,
  a shape of the calcium lanthanum boride fine particles is at least one shape selected from the following 1) and 2):
    1) a shape in which a scattering intensity of the calcium lanthanum boride fine particles diluted and dispersed in a solvent measured using a small-angle X-ray scattering method is such that a slope value Ve of a straight line obtained by double-logarithmic plotting of a relationship between scattering vector $q = 4\pi \sin \theta/\lambda$ and scattering intensity $I(q)$ is in a range of $-3.8 \leq Ve \leq -1.5$;
    2) a flat cylindrical (wherein a diameter of a bottom circle is d and a height of a cylinder is h) shape, or a spheroidal (wherein a length of a long axis is d and a length of a short axis is h) shape, with a value of aspect ratio d/h being in a range of $1.5 \leq d/h \leq 20$.

A second invention provides
the solar radiation shielding fine particle dispersion body according to the first invention,
wherein a value of x is in a range of $0.100 \leq x \leq 0.625$, and a value of m is $5.0 \leq m < 6.3$ in the general formula.

A third invention provides
the solar radiation shielding fine particle dispersion body according to the first or second invention,
which is a mixture comprising two or more kinds of calcium lanthanum boride fine particles having different values of x in the general formula.

A fourth invention provides
the solar radiation shielding fine particle dispersion body according to any one of the first to third inventions,
wherein a polymeric dispersant is contained in the solar radiation shielding fine particle dispersion body.

A fifth invention provides
the solar radiation shielding fine particle dispersion body according to the forth invention,
wherein the mixing ratio of the polymeric dispersant with respect to the solar radiation shielding fine particles is 0.3 parts by mass or more and less than 20 parts by mass of the polymeric dispersant with respect to 1 part by mass of the solar radiation shielding fine particles.

A sixth invention provides
the solar radiation shielding fine particle dispersion body according to any one of the first to fifth inventions,
wherein the solar radiation shielding fine particles have a surface covering layer containing at least one kind selected from a silicon compound, a titanium compound, a zirconium compound, and an aluminum compound.

A seventh invention provides
a solar radiation shielding fine particle-containing masterbatch obtained by kneading the solar radiation shielding fine particle dispersion body according to any one of claims 1 to 6 and a thermoplastic resin,
wherein the solar radiation shielding fine particles are uniformly dispersed in the thermoplastic resin.

An eighth invention provides
the solar radiation shielding fine particle-containing masterbatch according to the seventh invention,
wherein the content of the solar radiation shielding fine particles with respect to the thermoplastic resin is 0.01 parts by mass or more and 20 parts by mass or less of the solar radiation shielding fine particles with respect to 100 parts by mass of the thermoplastic resin.

A ninth invention provides
the solar radiation shielding fine particle-containing masterbatch according to the seventh or eighth invention,
wherein the thermoplastic resin is one kind of resin selected from a resin group including polycarbonate resin, (meth)acrylic resin, polyether imide resin, polyester resin, polystyrene resin, (meth)acrylic—styrene copolymer (MS resin), polyether sulfone resin, fluorine-based resin, vinyl resin, and polyolefin resin, or a mixture of two or more kinds of resins selected from the resin group, or a copolymer of two or more kinds of resins selected from the resin group.

A tenth invention provides a solar radiation shielding formed body, including:
  the solar radiation shielding fine particle-containing masterbatch according to any one of the seventh to ninth inventions, and
  a forming material including a thermoplastic resin of the same kind as that contained in the solar radiation shielding fine particle-containing masterbatch, and/or a forming material including a different kind of a thermoplastic resin having compatibility, which is formed into a predetermined shape.

An eleventh invention provides the solar radiation shielding resin formed body according to the tenth invention, the shape of which is flat or three-dimensional.

A twelfth invention provides the solar radiation shielding resin laminate, including the solar radiation shielding resin formed body according to the tenth or eleventh invention, stacked on a separate transparent formed body.

A thirteenth invention provides a method for producing a solar radiation shielding fine particle dispersion body that is a liquid solar radiation shielding fine particle dispersion body, comprising: a mixture of at least one selected from an organic solvent and a plasticizer, and solar radiation shielding fine particles, which are dispersed therein, or a solar radiation shielding fine particle dispersion body, comprising: a powder solar radiation shielding fine particle dispersion material, which is obtained by removing a liquid component from the solar radiation fine particle dispersion body with heating, and dispersed in a resin component, wherein the solar radiation shielding fine particles are solar radiation shielding fine particles containing calcium lanthanum boride fine particles represented by general formula $Ca_xLa_{1-x}B_m$, a value of x is in a range of $0.001 \leq x \leq 0.800$, and a value of m is in a range of $5.0 \leq m < 6.3$ in the general formula, an average dispersed particle size is 1 nm or more and 800 nm or less, a fine particle shape of the calcium lanthanum boride fine particles is at least one shape selected from the following 1) and 2):

1) a shape in which a scattering intensity of the calcium lanthanum boride fine particles diluted and dispersed in a solvent measured using a small-angle X-ray scattering method is such that a slope value Ve of a straight line obtained by double-logarithmic plotting of a relationship between scattering vector $q = 4\pi \sin \theta/\lambda$ and scattering intensity I (q) is in a range of $-3.8 \leq Ve \leq -1.5$;

2) a flat cylindrical (wherein a diameter of a bottom circle is d and a height of a cylinder is h) shape, or a spheroidal (wherein a length of a long axis is d and a length of a short axis is h) shape, with a value of aspect ratio d/h being in a range of $1.5 \leq d/h \leq 20$.

Advantage of the Invention

The solar radiation shielding fine particle dispersion body, solar radiation shielding fine particle-containing masterbatch, and solar radiation shielding resin formed body and solar radiation shielding resin laminate obtained by forming them into a predetermined shape, according to the present invention, have high transmission performance in the visible light region, are less colored, have low haze, and, at the same time, have excellent solar radiation shielding property, stable weather resistance (oxidation resistance, water resistance, moisture resistance, UV resistance).

DETAILED DESCRIPTION OF THE INVENTION

The solar radiation shielding fine particle dispersion body, the solar radiation shielding fine particle-containing masterbatch, and the solar radiation shielding resin formed body and solar radiation solar radiation shielding laminate obtained by forming them into a predetermined shape, according to the present invention will be described in the following order: [a] Solar radiation shielding fine particles, [b] Method for producing solar radiation shielding fine particles, [c] Solar radiation shielding fine particle dispersion body and method for production thereof, [d] Solar radiation shielding fine particle-containing masterbatch and method for production thereof, [e] Solar radiation shielding resin formed body and method for production thereof, and [f] Solar radiation shielding resin laminate and method for production thereof.

[a] Solar Radiation Shielding Fine Particles

The solar radiation shielding fine particles according to the present invention are solar radiation shielding fine particles containing calcium lanthanum boride fine particles represented by general formula $Ca_xLa_{1-x}B_m$ (wherein $0.001 \leq x \leq 0.800$, $5.0 \leq m < 6.3$).

Hereafter, the calcium lanthanum boride fine particles according to the present invention will be described in detail in the following order: (1) Crystal structure, (2) Ca content [x: $0.001 \leq x \leq 0.800$], (3) B (boron) content [$5.0 \leq m < 6.3$], (4) Shape of fine particles, (5) Average dispersed particle size of fine particles, and (6) Surface treatment of fine particles.

(1) Crystal Structure

Figure 1:
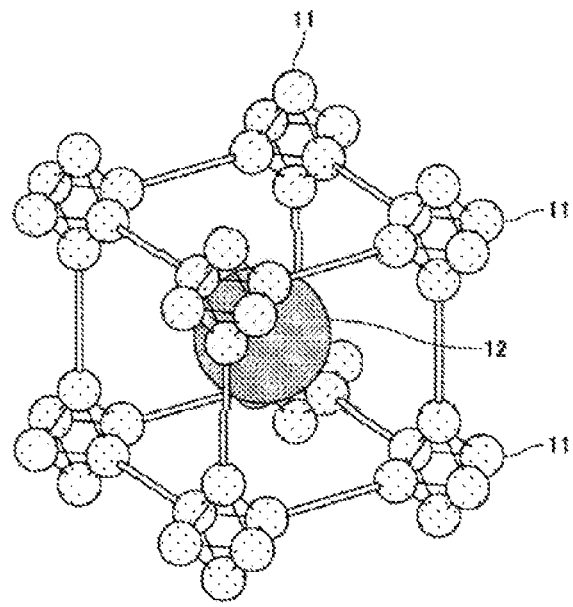
FIG. 1 is a schematic view illustrating a crystal structure of hexaboride.

A crystal structure of hexaboride (general formula $MB_6$) is shown in FIG. 1.

As shown in FIG. 1, the hexaboride has a cubic system and a simple cubic structure, and an octahedron formed of six boron atoms 11 is arranged at each vertex of the cube. Then, an element M12 is disposed in a central space surrounded by eight octahedrons formed of boron atoms 11.

As described above, the calcium lanthanum boride according to the present invention is represented by general formula $Ca_xLa_{1-x}B_m$ (satisfying $0.001 \leq x \leq 0.800$, $5.0 \leq m < 6.3$). Similarly to its terminal compositions, $CaB_6$ (wherein x=1, m=6) and $LaB_6$ (wherein x=0, m=6), the $Ca_xLa_{1-x}B_m$ fine particles have a crystal structure of space group Pm (−3)m, and Bravais lattice of a simple cubic structure. Ca or La atom is disposed at the body-center position, and an octahedron of six assembled B atoms is disposed at the corner position.

Conventionally known $LaB_6$ is a metal compound having a large amount of free electrons and when miniaturized to a state of nano-sized fine particles, external electromagnetic waves can be resonantly absorbed due to localized surface plasmon resonance of free electrons. Therefore, the solar radiation shielding effect of $LaB_6$ applies this principle.

On the other hand, the present inventors made intensive studies and found an effect of substituting La position in $LaB_6$ with an alkaline earth element of group-II elements.

Then, it is found that calcium lanthanum boride fine particles represented by general formula $Ca_xLa_{1-x}B_m$ (satisfying $0.001 \le x \le 0.800$, $5.0 \le m < 6.3$) wherein La is partially substituted with Ca which is the alkali earth element, has an effect of dramatically improving a visible light transmission property according to an addition amount of Ca while maintaining a high infrared absorption effect.

(2) Ca Content [x: $0.001 \le x \le 0.800$]

In the calcium lanthanum boride [$Ca_xLa_{1-x}B_m$] fine particles according to the present invention, Ca is completely dissolved at La position. However, it is important that Ca content x be in a range of $0.001 \le x \le 0.800$. When the Ca content x is greater than 0.001, the effect of improving the visible light transmittance becomes apparent. On the other hand, when x is 0.800 or less, the effect of improving the visible light transmittance, which is substantially different from $CaB_6$, is a clear characteristic of the present invention. Thus, the effect of the present invention can be obtained.

A more preferable composition for sufficiently obtaining a height of the visible light transmission property which is the effect of the present invention is as follows: the Ca content x is in a range of $0.100 \le x \le 0.625$. This is because in this composition range, an improvement effect of suppressing green coloration is remarkable, and at the same time, sufficient infrared absorption property can be exhibited in a coating layer in which the calcium lanthanum boride fine particles are contained and dispersed.

Further, the calcium lanthanum boride fine particles according to the present invention also have a preferable configuration in which two or more calcium lanthanum boride fine particles having compositions with different values of Ca content x are used in combination. This is because calcium lanthanum boride fine particles having different values of Ca content x have different absorption wavelengths. Accordingly, there is an effect of substantially broadening an absorption peak wavelength when mixing fine particles having different x values.

The detailed reason is not clear, but experiments indicate that particularly, when fine particles substituted with Ca:La=1:3 (i.e., x=0.25) and fine particles substituted with Ca:La=3:1 (i.e., x=0.75) are mixed in various proportions, a near-infrared radiation shielding layer is formed in which transmission property in the visible range and absorptivity of near-infrared radiations are well-balanced.

The calcium lanthanum boride fine particles according to the present invention may contain some unavoidable impurities within a range of allowing usual industrial implementation. For example, a small amount of an element such as Ce, Pr, Nd, Gd, Tb, Dy, Ho, Y, Sm, Eu, Er, Tm, Yb, Lu, and Sr may be contained, as an impurity to be substituted at La position. Further, a small amount of an element such as C, N or O may be contained, as an impurity to be substituted at B (boron) position. Furthermore, the impurities may be contained to such an extent that they are introduced in small amounts in other conventional industrial production processes.

According to the results of preparing the $CaB_6$ fine particle dispersion body and performing optical absorption measurement, it has surface plasmon resonance absorption in a mid-infrared region, and has semi-metal properties of very low free electron concentration.

Further, in the calcium lanthanum boride, Ca completely dissolves at La position. The change of an absorption wavelength caused by addition of Ca in the calcium lanthanum boride was investigated. Then, in the case of a fine particle group having a particle shape that is approximated to a spherical shape on average, the absorption wavelength gradually extends to a longer wavelength side from about 600 nm for $LaB_6$ fine particles to about 3200 nm for $CaB_6$ fine particles, which is caused by increase of Ca.

However, it is found that the change of the absorption wavelength is not uniform, and smaller on La-rich side, suddenly increases on Ca-rich side.

Namely, when the calcium lanthanum boride fine particles are approximated to spherical particles, the plasma absorption wavelength is about 200 nm longer from around 600 nm to around 800 nm in the composition range where the value x of the Ca content is $0.0 \le x \le 0.5$. On the other hand, it is found that in the composition range where the value x of the Ca content is $0.5 \le x \le 1.0$, the rate of change of the plasma absorption wavelength rapidly increases, and the rate of change is around 2400 nm from around 800 nm wavelength to around 3200 nm wavelength.

Further, in an intermediate composition of the calcium lanthanum boride to which these Ca are added, reduction of a blue side transmittance, which may contribute to strong green coloration of $LaB_6$ described above, is improved. Particularly, it is found that in the composition range where the value x of the Ca content is in a range of $0.5 \le x \le 0.8$, a green color tone becomes lighter and changes toward a neutral color tone, which is very useful for practical use.

A mechanism of the effect of improving the visible light transmission property by adding Ca to $LaB_6$ will be described hereafter.

In non-patent document 1, the present inventors reveal that the visible light transmission property and the cause of coloration of $LaB_6$ can be understood from its electronic structure.

Namely, since a $MB_6$ material based on group-III elements including $LaB_6$ (wherein M is an element selected from Sc, Y, La and Ac) has a wide gap electronic structure at a point other than a F point and X point in the Brillouin zone, transmission property should be basically high. Meanwhile the gap is narrow at the F point, and a free electron-like bands overlap with the lower part of the conduction band and the upper part of the valence band and extend across therebetween at the point X, and such a state can be a cause of low energy electron transitions, i.e., deep coloration.

However, an upper part of the valence band is mainly boron 2p orbital, and a lower part of the conduction band is a hybrid orbital of La 5d orbital and boron 2p orbital. Therefore, it is found that Fermi's golden rule greatly reduces a transition probability of electrons, causing visible light transmission property.

Based on the above findings, the present inventors further studied the effect of improving the visible light transmission property by addition of other elements to $LaB_6$.

As a result, it is found that in $SrB_6$ and $BaB_6$ based on group-II elements as additive elements, each 3d and 4d electrons form a hybrid orbital with boron 2p electrons to similarly produce visible light transmission property. However, it is newly revealed that, in the case of $CaB_6$ including an element belonging to the same group-II, the energy of boron 2p electrons in the valence band is relatively low, and the band gap formed with the Ca-3d orbital becomes relatively wider, and thus has a distribution form of electronic transition slightly different from that of the ordinary d-p type.

Based on the above new finding, the present inventors recognize that: in the calcium lanthanum boride according to the present invention, the improvement in the visible light transmission property of $LaB_6$ by addition of Ca is considered to be attributed to the hybrid band of Ca-3d orbital and B (boron)-2p orbital around the X point.

Now, a relationship between infrared absorption by plasma absorption and visible light transmission property in the calcium lanthanum boride according to the present invention will be described. In general, the intensity of plasma absorption decreases with the decrease of a free electron density. In the calcium lanthanum boride, an amount of the free electrons decreases with the decrease of La, and therefore an absorption peak tends to be smaller as the value x of the Ca content is larger. On the other hand, the visible light transmittance increases as the value x of the Ca content increases, and therefore more calcium lanthanum boride fine particles can be introduced into a layer. Namely, in an actual calcium lanthanum boride fine particle dispersed layer, the abundance of the fine particles has an effect of compensating for the decrease of the intensity of plasma absorption. As a result, when the calcium lanthanum boride fine particles are considered as a transparent solar radiation shielding material, properties thereof are determined by a balance between intensity of plasma absorption and intensity of the visible light transmittance. Accordingly, even in a case of the calcium lanthanum boride fine particles having high Ca content, it is found that the transmittance can be large at visible wavelengths, and a strong solar radiation shielding effect can be exhibited.

(3) B (Boron) Content [$5.0 \leq m < 6.3$]

In the calcium lanthanum boride $Ca_xLa_{1-x}B_m$ (satisfying $0.001 \leq x \leq 0.800$) fine particles according to the present invention, elements Ca and La are collectively referred to as M element. Then, it is important that the atomic number ratio m of B (boron) to one atom of M element obtained by chemical analysis of the powder containing the boride fine particles is $5.0 \leq m < 6.3$.

Examples of the fine particles of borides represented by general formula MBm include borides represented by $MB_4$, $MB_6$, $MB_{12}$, etc. For the boride fine particles for shielding against solar radiation, it is important that the value of the atomic ratio m of B (boron) is in a range of $5.0 \leq m < 6.3$. In the case where $m \geq 5.0$, generation of MB, $MB_2$ and the like is suppressed, and the solar radiation shielding property is improved. On the other hand, when satisfying $m < 6.3$, generation of boron oxide particles other than boride fine particles is suppressed. The boron oxide fine particles are hygroscopic. Therefore, when the boron oxide particles are mixed in the boride powder, the moisture resistance of the boride powder will be reduced, and the deterioration of the solar radiation shielding properties will become large over time.

Therefore, it is preferable to suppress the generation of boron oxide particles, by setting the value of m to satisfy $m < 6.3$.

In view of the foregoing, it is important that among the above-described borides, $MB_6$ is mainly contained in the boride fine particles for shielding against solar radiation, but $MB_4$ and $MB_{12}$ may also be partially contained.

In a case of producing the above-described boride fine particles, when the wet analysis is performed, the value of the atomic number ratio value m of B (boron) actually fluctuates slightly from 6 and may contain a slight amount of other phases. According to X-ray diffraction and TEM observation, these phases are $LaBO_3$ and $B_2O_3$, which are considered to be produced as reaction products when the raw material absorbs moisture in the air. In any case, it is important that the main body of the heat ray shielding effect is $MB_6$ fine particles, and the value of m satisfies $5.0 \leq m < 6.3$, including a composition fluctuation of the boride fine particles themselves.

(4) Shape of Fine Particles

The shape of the calcium lanthanum boride fine particles which are solar radiation shielding fine particles is approximately a disc, a flat cylindrical, a flat, a pancake, or a flat disc-like spheroidal.

Specifically, the fine particle shape of the calcium lanthanum boride fine particles satisfies at least one of the following:

1) a shape in which a scattering intensity of the calcium lanthanum boride fine particles diluted and dispersed in a solvent measured using a small-angle X-ray scattering method is such that a slope value Ve of a straight line obtained by double-logarithmic plotting of a relationship between scattering vector $q = 4\pi \sin \theta / \lambda$ and scattering intensity I (q) is in a range of $-3.8 \leq Ve \leq -1.5$;

2) a flat cylindrical (wherein a diameter of a bottom circle is d and a height of a cylinder is h) shape, or a spheroidal (wherein a length of a long axis is d and a length of a short axis is h) shape, with a value of aspect ratio d/h being in a range of $1.5 \leq d/h \leq 20$.

Preferable shapes of 1) and 2) of the calcium lanthanum boride fine particles will be described more specifically hereafter.

Preferred Shape of 1)

In the shape, a scattering intensity of the calcium lanthanum boride fine particles diluted and dispersed in a solvent measured using a small-angle X-ray scattering method is such that a slope value Ve of a straight line obtained by double-logarithmic plotting of a relationship between scattering vector $q = 4\pi \sin \theta / \lambda$ and scattering intensity I (q) is in a range of $-3.8 \leq Ve \leq -1.5$, and more preferably $-3.8 \leq Ve \leq -2.0$.

Here, the measurement by the small-angle X-ray scattering method described above is performed in the case where the scattered X-rays are observed at a position of an angle $2\theta$ from the incident X-rays incident on the fine particles. There is an optical path difference in the scattered X-rays passing through two points separated by r in the fine particle, and a phase difference is denoted as r·q using the scattering vector q (defined by a difference of the wave number vector between the incident X-ray and that of the scattered X-ray).

First, the x-ray small-angle scattering used to define the shape of the calcium lanthanum boride fine particles according to the present invention will be described. Small-angle X-ray scattering is a method of measuring scattered X-rays having a scattering angle of several degrees or less.

When a wavelength of X-rays is denoted as $\lambda$ and a scattering angle is denoted as $2\theta$, the scattered X-rays having smaller scattering angles is measured from Bragg's law $\lambda = 2d \sin \theta$. Therefore, such a measurement corresponds to a measurement of a large structure in real space.

In addition, measurement of the scattered X-rays having different scattering angles by the small-angle X-ray scattering method, corresponds to observation of a substance with different spatial resolutions. Namely, coarse-grained structural information can be obtained from the scattered X-rays having a small scattering angle, and structural information with higher spatial resolution can be obtained from the scattered X-rays having a large scattering angle.

Specifically, when a scatterer is particulate, the scattering is observed as follows. As the scattering angle $2\theta$ or the scattering vector ($q = 4\pi \sin \theta / \lambda$) decreases, scattering corresponding to structural information observed at a larger scale is observed such as the structure of atoms and molecules in particles, the structure of particle surfaces (smoothness and density profile), the shape of particles, and the size of particles.

On the other hand, since scattering intensity I (q) is obtained by the Fourier transform of the autocorrelation function of the electron density distribution, the scattering function of the scatterer having an arbitrary shape can be specifically calculated. The square of a scattering amplitude of this scattering function is the scattering intensity.

Here, when the scattering intensity is calculated in a case of the scatterer having an extreme shape such as a sphere, an infinitely thin and long rod, an infinitely thin disc, an exponential law is established for the scattering intensity I (q) and the scattering vector q. Accordingly, rough shape information of the scatterer can be obtained by taking a double-logarithmic plot of the scattering intensity I (q) and the scattering vector q to obtain the slope of the plot. Specifically, in the case of the above-described extreme shape, the slope of the plot is known as follows. In the case of a sphere: the slope is −4, in the case of an infinitely thin and long rod: the slope is −1, and in the case of an infinitely thin disc: the slope is −2.

As described above, the particle shape of the calcium lanthanum boride fine particles according to the present invention is considered as follows. The particle shape of the calcium lanthanum boride fine particles can be evaluated by measuring the scattering intensity of the fine particles diluted and dispersed in IPA using the small-angle X-ray scattering method described above, then double-logarithmically plotting the relationship between the scattering intensity I (q) and the scattering vector q, and calculating the slope of the plot.

On the other hand, as well known, due to a localized surface plasmon resonance effect, a resonance wavelength is changed according to the particle shape. In general, in the case of a spherical shape, an absorption wavelength is obtained at a shortest wavelength. In the case where the particle shape is changed from spherical shape to disc-like (wherein long axis length is a=b and short axis length is c), the absorption wavelength shifts to a long wavelength side, and simultaneously the absorption wavelength splits into a short wavelength peak corresponding to resonance on the short axis and a long wavelength peak corresponding to resonance on the long axis.

Further, in the case of the disc-like fine particles, the short wavelength peak corresponding to the resonance on the short axis is relatively smaller than the long wavelength peak corresponding to the resonance on the long axis. When this effect is summed up for a group of fine particles existing by a number comparable to the Avogadro number, the short wavelength peak disappears, and the long wavelength peak becomes one large broad peak. Accordingly, from a near infrared absorption performance, the disc-like fine particles are preferable because the plasmon resonance wavelength is shifted to the longer wavelength side and large near-infrared absorption can be obtained as compared with the case of the spherical fine particles.

On the other hand, in the case of the rod-like (thin and long rod-like) fine particles, since the short wavelength peak corresponding to the resonance on the short axis becomes relatively strong, the peak splits into the short wavelength peak and the long wavelength peak corresponding to the resonance on the long axis. When this effect is observed for a huge number of fine particles comparable to the Avogadro's number, such a split state remains, and such a state is not desired for the solar radiation shielding layer according to the present invention because an object of the present invention is to overcome problems by controlling the optical response clearly separately between the visible light transmission property and the near infrared absorption property.

As described above, from the relationship between the calcium lanthanum boride fine particles and the resonance wavelength of their localized surface plasmon resonance, the present inventors achieve a preferable form of the calcium lanthanum boride fine particles according to the present invention. Specifically, the present inventors found that when the scattering intensity of the fine particles dispersed in a solvent is measured using the small-angle X-ray scattering method, it is important that a slope value Ve of a straight line obtained by double-logarithmic plotting of a relationship between scattering vector $q=4\pi \sin \theta/\lambda$ and scattering intensity I (q) is in a range of $-3.8 \leq Ve \leq -1.5$, and more preferably $-3.8 \leq Ve \leq -2.0$.

When the slope Ve described above is −3.8 or more, the particle shape of the calcium lanthanum boride fine particles does not become spherical, and a collective effect of shape anisotropy increases. Therefore, the bandwidth of the plasmon absorption is widened and the near-infrared absorption effect is increased.

On the other hand, when the slope Ve is −1.5 or less, the particle shape of the calcium lanthanum boride fine particles does not become a rod shape (needle shape, bar shape). Therefore, the resonance in the long axis direction becomes strong and the resonance in the short axis direction becomes weak. At the same time, the splitting of the resonant wavelength does not become more remarkable and the near-infrared absorption effect is increased. Further, since the resonance wavelength in the short axis direction is out of the visible light region, the visible light transmittance does not decrease, thereby not causing coloration (layer coloration).

Preferred Shape of 2)

Another preferable shape of the calcium lanthanum boride fine particles is a flat cylindrical (wherein a diameter of a bottom circle is d and a height of a cylinder is h), or a spheroid (wherein, a length of a long axis is d and a length of a short axis is h). In the flat cylinder or the spheroid, it is important that the aspect ratio d/h is in a range of $1.5 \leq d/h \leq 20$.

The present inventors found that in non-patent document 2, when $LaB_6$ nano-sized fine particles are a group including disc-like fine particles having various d/h values (wherein d is a long axis length and h is a short axis length), the plasmon absorption bandwidth actually becomes seven times or more wider than the plasmon absorption bandwidth of a group of uniformly spherical $LaB_6$ nano-sized fine particles.

As a result, in the case of the disc-like calcium lanthanum boride fine particles having a composition of Ca content x according to the present invention, the peak of the absorption wavelength is characteristically shifted toward longer wavelength side by several hundreds nm compared to that of spherical fine particles in accordance with the ratio d/h of the disc shape (d is long axis length and h is short axis length). Therefore, for the disc-shaped calcium lanthanum boride fine particles, it is important to modify the above-mentioned optimum element composition in consideration of the shape factor.

Specifically, it is preferable that the calcium lanthanum boride fine particles according to the present invention are disc-like fine particles, and the aspect ratio d/h is preferably in a range of $1.5 \leq d/h \leq 20$ in the flat cylinder (wherein d is a diameter of a bottom circle and h is a height of a cylinder) or in the spheroid (wherein d is a length of a long axis and h is a length of a short axis).

With the particle shape in the above range, the calcium lanthanum boride fine particles according to the present invention have sufficient properties as a heat ray shielding material which widely shields a heat ray component contained in the sunlight, and can improve the visible light transmittance rather than the conventionally known heat ray shielding material.

The reason is as follows. When the aspect ratio d/h is less than 1.5, the particle shape of the calcium lanthanum boride fine particles becomes a thin cylinder shape (close to rod-like, bar-like). Accordingly, the near-infrared absorption effect is reduced similarly to the above-described case of Ve>-1.5 and the visible light transmittance is also reduced, undesirably causing coloration (layer coloration).

On the other hand, the aspect ratio d/h exceeding 20 provides large absorption in the near-infrared region. However, if the value of h represents a feasible thickness, d should be large and thereby the particle size should be very large. As a result, increased haze and decreased visible light transmission property become problematic. Conversely, when the value of d is reduced to a level free from concern about haze, h should be correspondingly decreased. However, a thickness as thin as 0.1 nm cannot be attained due to a limit on thinning of the particle. Therefore, d/h exceeding 20 cannot be attained.

(5) Average Dispersed Particle Size of Fine Particles

An average dispersed particle size of the calcium lanthanum boride fine particles according to the present invention is preferably 800 nm or less. This is because when the average dispersed particle size is 800 nm or less, it is possible to secure the visibility of the visible light region and secure the transparency at the same time without completely shielding the light due to scattering, in the case where the calcium lanthanum boride fine particles are contained in a calcium lanthanum boride fine particle dispersion body described later. In the present invention, the average dispersed particle size of the calcium lanthanum boride fine particles refers to a value obtained by measuring the average dispersed particle size of the calcium lanthanum boride fine particles in the dispersion liquid by a dynamic light scattering method (FFT-power spectrum method). In the present invention, the average dispersed particle size may be simply referred to as an "average particle size".

In the calcium-lanthanum boride fine particles according to the present invention, particularly when the transparency of the visible light region is focused, it is preferable to also consider the reduction of scattering due to the calcium lanthanum boride fine particles.

If the reduction of scattering due to the calcium lanthanum boride fine particles is taken into consideration, the average dispersed particle size is preferably 100 nm or less. The reason is as follows. In the calcium lanthanum boride fine particle dispersion liquid and a calcium lanthanum boride particle dispersion body described later, if the average dispersed particle size of the fine particles is small, scattering of light in the visible light region in the wavelength range from 400 nm to 780 nm due to geometric scattering or Mie scattering is reduced. As a result of the scattering of the light being reduced, it is possible to prevent the fine particle dispersion body from becoming like frosted glass and losing clear transparency.

This is because the average dispersed particle size of the calcium lanthanum boride fine particles being 100 nm or less corresponds to a region where the Rayleigh scattering is dominant with the above-described geometrical scattering or Mie scattering being reduced. In the Rayleigh scattering region, the scattered light is proportional to the sixth power of the particle size, and therefore as the average dispersed particle size of the fine particles decreases, the scattering is reduced, and the transparency is improved. Further, when the average dispersed particle size of the calcium lanthanum boride fine particles is 50 nm or less, the scattered light is extremely reduced, which is particularly preferable. From a viewpoint of avoiding light scattering, it is preferable that the average dispersed particle size of the calcium lanthanum boride fine particles be smaller, and industrial production is not difficult if the average dispersed particle size is 1 nm or more.

(6) Surface Treatment of Fine Particles

The calcium lanthanum boride fine particles basically have very stable properties against UV light and sunlight as a characteristic of inorganic materials. Namely, there is almost no change in the material properties upon irradiation with UV light or sunlight, and almost no deterioration of color or functions occurs. Further, a crystal structure in which La and Ca ions are surrounded by a basic frame of strongly and covalently bonded $B_6$ octahedron is very stable, Therefore, even nano-sized fine particles have sufficient practical resistance to moisture, UV and moisture co-attack. As a result, basically, it can be said the calcium lanthanum boride fine particles have extremely stable weather resistance (oxidation resistance, water resistance, moisture resistance, UV resistance).

Further, if the surface of the calcium lanthanum boride fine particles is covered with a surface covering layer containing silicon compound, titanium compound, zirconium compound, aluminum compound, more specifically, an oxide and/or nitride containing one or more elements selected from silicon, titanium, zirconium, and aluminum, the weather resistance and chemical resistance of the fine particles can be further improved. In addition, in order to cover the calcium lanthanum boride fine particles with a surface covering layer containing silicone compound, it is beneficial to use silane compound.

On the other hand, in the calcium lanthanum boride fine particles according to the present invention, it is preferable that a surface is not oxidized, but usually it is often slightly oxidized. Although a detailed composition of the oxidized surface is unknown, a phase in which La and Ca elements are slightly contained in amorphous boron oxide $B_2O_3$ is considered to have an outermost surface property.

Further, in a dispersion step of calcium lanthanum boride fine particles described later, it is inevitable that oxidation of the fine particle surface occurs to some extent. However, even in this case, an ability to cause plasmon resonance is maintained within the fine particle, and therefore the effectiveness of exhibiting a near-infrared shielding effect is maintained. Accordingly, for example, even calcium lanthanum boride fine particles whose surface is oxidized can be used as the calcium lanthanum boride fine particles according to the present invention.

Further, in the calcium lanthanum boride fine particles according to the present invention, the higher a crystal perfection, the greater the near-infrared shielding effect. However, even the particles having low crystallinity and exhibiting a broad diffraction peak by X-ray diffraction produce a near-infrared shielding effect as long as the basic bond inside the fine particles is formed by bonding each metal element to the hexaboride skeleton. Therefore, such calcium lanthanum boride fine particles can be used in the present invention.

[b] Method for Producing Solar Radiation Shielding Fine Particles

There are various methods for producing the calcium lanthanum boride fine particles contained in the solar radiation shielding fine particles according to the present invention.

Preferred examples of the method for producing the calcium lanthanum boride fine particles according to the present invention will be described in detail hereafter in the following order: (1) Solid phase reaction method, (2) CVD method, (3) Direct reaction method between elements, (4) Thermal plasma method, (5) Molten salt electrolysis method, other methods, and (6) Summary of production methods.

(1) Solid Phase Reaction Method

For example, the solid phase reaction method by $B_4C$ reduction described in non-patent document 3 and non-patent document 4 can be used with modification. According to the solid phase reaction method, oxide sources $La_2O_3$ and CaO are mixed with $B_4C$ and reacted at high temperature in vacuum or in an inert gas. Then, calcium lanthanum boride $Ca_xLa_{1-x}B_m$ can be obtained by a reducing action of $B_4C$. However, since a firing temperature is as high as 1500° C. to 1600° C. in the solid phase reaction, the obtained $Ca_xLa_{1-x}B_m$ particles are coarsened.

On the other hand, as described above, in order to use the calcium lanthanum boride fine particles in heat shielding applications, a particle size is required to be sufficiently smaller than a visible light wavelength. Therefore, it is important that the coarsened calcium lanthanum boride fine particles be finely strongly pulverized into nano-sized fine particles by a mechanical method using a jet mill, a ball mill, an attritor, a bead mill, a paint shaker, or the like.

In the production of $Ca_xLa_{1-x}B_m$ by the solid-phase reaction method, homogenization is relatively difficult. Therefore, in the production of $Ca_xLa_{1-x}B_m$, $CaB_6$ and $LaB_6$ may be separated locally, as compared to a case of simply producing $CaB_6$ or $LaB_6$. It is found to be quite difficult for Ca and La with different valences to uniformly occupy a body-centered position of a simple cubic lattice formed by eight $B_6$ octahedrons. Accordingly, in a case of using the solid phase reaction method, it is preferable to keep the temperature as high as possible for a long time during firing.

On the other hand, using sodium borohydride $NaBH_4$ as the B (boron) raw material is also a preferable configuration as another method in the case of using the solid phase reaction method for producing the calcium lanthanum boride. $NaBH_4$ not only provides a boron source, but also is decomposed as follows: $NaB_4$ (s)→NaH (s)+BH3 (s) at 460° C. and BH3 (s)→B (s)+H2 (s) at 506° C., to form a gas phase.

As a result, elemental diffusion is significantly promoted and B diffusion is also promoted, and $Ca_xLa_{1-x}B_m$ can be formed by Ca and La so as to uniformly occupy the body-centered position of a simple cubic lattice formed by $B_6$ octahedrons. With the configuration, the firing temperature can be set to 1300° C. or less.

Further, adding metal powder such as Mg in order to promote reduction in the solid phase reaction method is also a preferable configuration. A great heat of reaction produced by the reduction reaction in the above configuration also has the effect of promoting the reaction of producing $Ca_xLa_{1-x}B_m$.

(2) CVD Method

The calcium lanthanum boride fine particles according to the present invention can also be obtained by a CVD (Chemical Vapor Deposition) method. This method is a method in which hydrogen reduction of metal halides gives borides.

Specifically, as a compound containing La or Ca, for example, $LaCl_3$ (lanthanum chloride) or $CaCl_2$ (calcium chloride) can be suitably used. As a compound containing boron, for example, $BCl_3$ (boron trichloride) can be suitably used.

The above raw materials and hydrogen gas and nitrogen gas are introduced into a reaction furnace and heated to a high temperature, and then boron trichloride gas is introduced and reacted.

$LaB_6$ single crystal or $CaB_6$ single crystal may be used as a reaction substrate. A deposited $Ca_xLa_{1-x}B_m$ is stripped from the substrate and washed to obtain calcium lanthanum boride fine particles. It is important that the obtained calcium lanthanum boride fine particles be more strongly pulverized into nano-sized fine particles by a mechanical method using a jet mill, a ball mill, an attritor, a bead mill, or the like. Further, it is also possible to obtain nano-sized calcium lanthanum boride fine particles directly by adjusting CVD reaction conditions.

(3) Direct Reaction Method Between Elements

The calcium lanthanum boride fine particles according to the present invention can also be obtained by a direct reaction between elements. Namely, when calcium metal and lanthanum metal are reacted with boron at a high temperature of 1700° C. or more, boride of high purity can be obtained. However, the raw materials are very expensive, and therefore the above process is generally not industrial.

(4) Thermal Plasma Method

The calcium lanthanum boride fine particles according to the present invention can also be produced by a thermal plasma method. According to this method, it is possible to directly produce nano-sized fine particles by reacting raw materials in a thermal plasma reactor. In the case of the thermal plasma method, it is characteristic that lattice defects are hardly introduced into fine particles, because the mechanical pulverization step required in the final step of the above-described method can be omitted. When the number of lattice defects is small, a relaxation time of free electrons is increased, and therefore there is an effect of making a near-infrared absorption wavelength shifted to a short wavelength side.

As the thermal plasma, for example, any one of DC arc plasma, high-frequency plasma, microwave plasma, low frequency alternating current plasma, or superimposed plasma of them, or plasma generated by an electric method of applying a magnetic field to direct current plasma, plasma generated by irradiation with a high power laser, and plasma generated by high power electron beam or ion beam, can be used. Regardless of which thermal plasma is used, it is a thermal plasma having a high temperature part of 10000 to 15000 K. Particularly, it is preferably a plasma capable of controlling the time for generating the ultra-fine particles.

The raw material fed into the thermal plasma having the high temperature part is evaporated instantaneously in the high temperature part. Then, the evaporated raw material is condensed in the course of reaching a plasma tail flame part, and is rapidly solidified outside of the plasma flame, thereby producing the calcium lanthanum boride fine particles. A synthesis method will be described in detail with reference to FIG. 2 taking a case of using a high-frequency plasma reaction device as an example.

Figure 2:
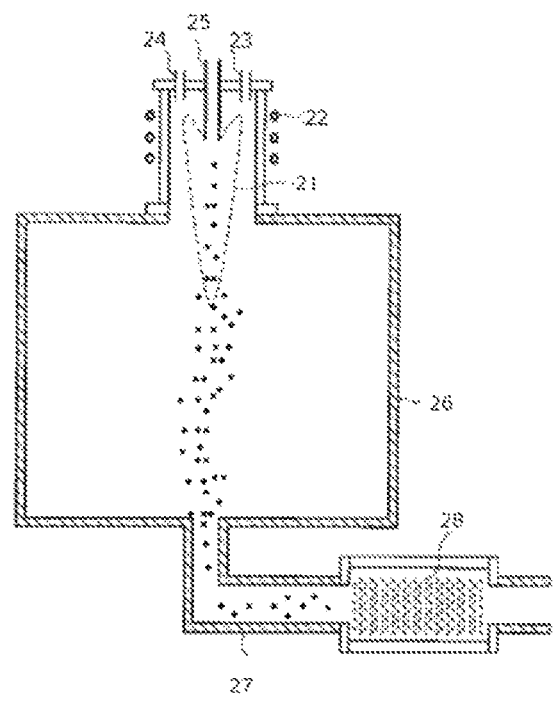
FIG. 2 is a conceptual view of one embodiment of a high frequency thermal plasma reactor used for producing the solar radiation shielding fine particles according to the present invention.

In the high frequency thermal plasma reactor illustrated in FIG. 2, first, an inside of a reaction system constituted by an inside of a water-cooled quartz double tube and an inside of a reaction vessel 26 is evacuated by an evacuation device, and thereafter the reaction system is filled with argon gas. Thereafter, any gas selected from argon gas, mixed gas of argon and helium (Ar—He mixed gas), or mixed gas of argon and nitrogen (Ar— $N_2$ mixed gas) is introduced as plasma gas into the reaction vessel from the plasma gas supply nozzle 24. On the other hand, Ar—He mixed gas is introduced from the sheath gas supply nozzle 23 as the sheath gas flowing immediately outside of the plasma region. Then, an alternating current is applied to a high frequency coil 22 to generate thermal plasma 21 by a high frequency electromagnetic field (for example, a frequency of 4 MHz).

Here, reaction is carried out for a predetermined time by introducing mixed powder as the raw material from a raw material powder supply nozzle 25 into thermal plasma, using argon gas supplied from a gas supply device (not shown) as carrier gas. After the reaction, the produced calcium lanthanum boride fine particles pass through a suction tube 27 and become deposited on a filter 28, and are collected.

The plasma gas has a function of keeping a thermal plasma region having a high temperature part of 10000 to 15000 K, and the sheath gas has a function of cooling an inner wall surface of a quartz torch in the reaction vessel and preventing melting of the quartz torch. Further, the plasma gas and the sheath gas affect a shape of the plasma region, so a shape control of the plasma region can be performed by adjusting a flow rate of these gases. Further, it is important to control the generation time of the generated fine particles by adjusting a flow rate of the carrier gas and a supply rate of the raw material.

(5) Molten Salt Electrolysis Method, Other Methods

Calcium lanthanum boride fine particles can be synthesized also by molten salt electrolysis, combustion synthesis, solvothermal method, autoclave method, wet method or the like.

The method for producing calcium lanthanum boride fine particles is not limited to the above-described production methods, and any method capable of producing calcium lanthanum boride fine particles according to the present invention may be used.

(6) Summary of Production Methods

The particle shape and size of the calcium lanthanum boride fine particles produced by the production method described in the above (1) to (5) can be controlled in various producing steps of the fine particles.

In the case of employing the step of pulverizing into nano-sized fine particles, the particle shape and the size are controlled according to a pulverizing method.

Calcium lanthanum boride is very hard because of a strong covalent bonding of B (boron), and a special method is required for pulverization. For example, when using a media stirring mill, it is known that a pulverization mode is different depending on a bead type and a bead size, and a gradual conversion of the pulverization mode is known to occur as pulverization proceeds from the early to the late stage.

In the case of the calcium lanthanum boride which is very hard, a solid follows the mode of volumetric pulverization in the early stage of pulverization, where it is broken coarsely without involving the surface. This volumetric pulverization is repeated to gradually decrease the size of particles. In the late stage of pulverization, the overall breakage takes place much less frequently even when force is applied onto the particles and the mode changes to surface pulverization where the particle surface is scraped off to produce numerous thin and fine particles. Therefore, the shape and the size of the pulverized fine particles are controlled by adjusting the pulverization conditions. As a result, the calcium lanthanum boride fine particles according to the present invention can be obtained which is approximately a disc, a flat cylindrical, a flat, a pancake, or a flat disc-like spheroidal.

Further, in the case of producing fine particles by build-up process, control of a particle shape is possible by appropriately combining parameters that control the respective reaction conditions.

For example, in the wet method, calcium lanthanum boride fine particles are produced by heating lanthanum chloride and calcium chloride and sodium borohydride at 300 to 500° C. in a neutral atmosphere. Addition of a small amount of isophthalic acid changes the size and shape of the calcium lanthanum boride fine particles.

Also, in the autoclave method, in addition to the reaction temperature and pressure, a small amount addition of an additive acting as a modifier is a point of controlling the size and the shape of the particles.

[c] Solar Radiation Shielding Particle Dispersion Body and Method for Production Thereof The solar radiation shielding fine particle dispersion body according to the present invention is a liquid solar radiation shielding fine particle dispersion body including a mixture of at least one kind selected from an organic solvent and a plasticizer and solar radiation shielding fine particles dispersed therein or a powder solar radiation shielding fine particle dispersion body in the resin component, or is formed by dispersing the powder solar radiation shielding fine particle dispersion body, obtained by removing a liquid component from the solar radiation shielding fine particle dispersion body with heating, in a resin component. A solar radiation shielding resin formed body in which the solar radiation shielding fine particles are dispersed in a resin component can be produced by using the solar radiation shielding fine particle dispersion body.

The above-described solar radiation shielding fine particle dispersion body may be, in addition to powder solar radiation shielding fine particle dispersion body obtained by removing a solution component with heating by a known method, a liquid solar radiation shielding fine particle dispersion body without removing the solution component added during pulverization and surface treatment steps as described above, and may also be a solar radiation shielding fine particle dispersion body dispersed in a raw material or in a plasticizer according to a resin used for the solar radiation shielding resin formed body. The organic solvent and plasticizer used here are not particularly limited and can be selected according to the conditions for forming the compounded resin, and general organic solvents and plasticizers can be used. Further, an acid or alkali may be added to adjust pH, if necessary.

The plasticizer is not particularly limited as long as it is generally used for a thermoplastic resin, and may be any known plasticizer which is generally used. For example, an organic ester-based plasticizer synthesized from a monohydric alcohol or a polyhydric alcohol and a fatty acid, or a phosphoric acid-based plasticizer such as an organic phosphoric acid-based or an organic phosphorous acid-based plasticizer can be used. Organic ester compounds synthesized from monohydric alcohols or polyhydric alcohols and fatty acids are preferred.

Among organic ester-based plasticizers, examples of an ester compound synthesized from polyhydric alcohol and fatty acid includes, for example, glycol-based esters obtained by reaction between glycols such as triethylene glycol, tetraethylene glycol, tripropylene glycol, and organic acids such as butyric acid, isobutyric acid, caproic acid, 2-ethylbutyric acid, heptanoic acid, n-octylic acid, 2-ethylhexylic acid, pelargonic acid (n-nonylic acid), decylic acid. Further, organic ester compounds obtained by reaction between an organic acid such as adipic acid, sebacic acid, azelaic acid, and a straight or branched alcohol containing 4 to 8 carbon atoms may be mentioned.

Specific examples of the above-described organic ester-based plasticizer include triethylene glycol di-2-ethylbutyrate, triethylene glycol di-2-ethylhexoate, triethylene glycol dicaprylate, triethylene glycol di-n-octoate, triethylene glycol di-n-heptoate, tetraethylene glycol di-n-heptoate, dibutyl sebacate, dioctyl azelate, dibutyl carbitol adipate, ethylene glycol di-2-ethylbutyrate, 1,3-propylene glycol di-2-ethylbutyrate, 1,4-propylene glycol di-2-ethylbutyrate, 1,4-butylene glycol di-2-ethylbutyrate, 1,2-butylene glycol di-2-ethylene butyrate, diethylene glycol di-2-ethylbutyrate, diethylene glycol di-2-ethylhexoate, dipropylene glycol di-2-ethylbutyrate, triethylene glycol di-2-ethyl pentoate, tetraethylene glycol di-2-ethylbutyrate, diethylene glycol dicapryate, triethylene glycol bis(2-ethyl butyrate), triethylene glycol diheptanoate, dihexyl adipate, dioctyl adipate, hexylcyclohexyl adipate, a mixture of heptyl adipate and nonyl adipate, diisononyl adipate, heptylnonyl adipate, dibutyl sebacate, oil-modified sebacic alkyd, a mixture of phosphate ester and adipate ester, adipate ester.

Next, examples of the above-described phosphoric acid-based plasticizer include, for example, tributoxyethyl phosphate, isodecylphenyl phosphate, and triisoproyl phosphite.

Among the above-described plasticizers, at least one kind selected from a group consisting of: dihexyl adipate (DHA), triethylene glycol-di-2-ethylhexanoate (3GO), tetraethylene glycol-di-2-ethylhexanoate (4GO), triethylene glycol-di-2-ethylbutyrate (3GH), tetraethylene glycol-di-2-ethylbutyrate (4GH), tetraethylene glycol-di-heptanoate (4G7), and triethylene glycol-di-heptanoate (3G7) is preferable. When a polyvinyl acetal resin is used as the thermoplastic resin contained in the solar radiation shielding fine particle dispersion body, these plasticizers have various properties such as compatibility with the above resins and cold resistance in a well-balanced manner. They are also excellent in processability and economy, and, when used in combination with a metal salt with an organic acid such as carboxylic acid having 2 to 16 carbon atoms or an inorganic acid such as nitric acid as an adhesive force regulator, can prevent adhesive force between glass and a heat ray shielding layer containing polyvinyl acetal resin as a thermoplastic resin from decreasing with time. Further, since they can prevent both whitening and decrease in adhesive force with time, they are preferred. The metal salt of carboxylic acid or the like as the adhesive force regulator is preferably a magnesium salt or a potassium salt as described later.

It is necessary to pay attention to hydrolysis when applying the plasticizer. From such a viewpoint, among these plasticizers, triethylene glycol-di-2-ethylhexanoate (3GO), triethylene glycol-di-2-ethylbutyrate (3GH), tetraethylene glycol-di-2-ethylhexanoate (4GO), dihexyl adipate (DHA), tetraethylene glycol-di-2-ethylbutyrate, tetraethylene glycol-di-heptanoate, and, triethylene glycol-di-heptanoate hardly cause hydrolysis and thus are particularly preferred.

The content of the plasticizer in the solar radiation shielding fine particle dispersion body is not particularly limited, but preferably 150 parts by mass or more and 4000 parts by mass or less with respect to 100 parts by mass of the calcium lanthanum boride fine particles. When the content of the plasticizer is 150 parts by mass or more, the dispersibility of the calcium lanthanum boride fine particles is ensured, so that the visible light transmittance of the intermediate film of the laminated glass using the solar radiation shielding fine particle dispersion body can be ensured and haze can be suppressed. When the content of the plasticizer is 4000 parts by mass or less, the life of the solar radiation shielding fine particle dispersion body can be ensured.

It is desirable that a polymeric dispersant be contained in the solar radiation shielding fine particle dispersion body. The mixing ratio of the solar radiation shielding fine particles and the polymeric dispersant is preferably 1 part by mass of the solar radiation shielding fine particles with respect to 0.3 parts by mass or more and less than 20 parts by mass of the polymeric dispersant.

With 0.3 parts by mass or more of the polymeric dispersant with respect to 1 part by mass of the fine particles for solar shading, aggregation can be avoided when the solar radiation shielding fine particles are introduced into an organic solvent, a plasticizer, and a resin. As a result, haze of the solar radiation shielding fine particle dispersion body can be suppressed. In addition, with less than 20 parts by mass with respect to 1 part by mass of the solar radiation fine particles, the amount of the polymeric dispersant in the solar radiation shielding fine particle dispersion body does not become excessive and has no adverse effect on the weather resistance of the solar radiation shielding fine particle dispersion body.

Examples of the polymeric dispersant used to obtain the above-described solar radiation fine particle dispersion body include polyacrylate-based dispersant, polyurethane-based dispersant, polyether-based dispersant, polyester-based dispersant, polyester urethane-based dispersant, and the like.

Examples of the polyacrylate-based dispersant include trade name: SN Thickener A-850, SN Thickener A-815 manufactured by SAN NOPCO LIMITED; trade name: EFKA4500, EFKA4530 (EFKA is registered trademark) manufactured by EFKAADDITIVES B.V.; trade name: Disperbyk-11(Disperbyk is registered trademark) manufactured by BYK-Chemie; and the like.

Examples of the polyurethane-based dispersant include trade name EFKA404, EFKA4047, EFKA4520(EFKA is registered trademark) manufactured by EFKAADDITIVES B.V.; trade name TEXAPHOR P0, TEXAPHORP3, TEXAPHOR P10, etc. (TEXAPHOR is registered trademark) manufactured by Cognis.

Further, examples of the polyether-based dispersant include trade name SN Thickener A-801, SN Thickener A-801, SN Thickener A-802, SN Thickener A-803, SN Thickener A-804, SN Thickener A-80 manufactured by SAN NOPCO LIMITED; and trade name DISPARLON DA234, DISPARLON DA325, and the like (DISPARLON is registered trademark) manufactured by Kusumoto Chemicals, Ltd.

Examples of polyester-based dispersant include trade name Solsperse 22000, Solsperse 24000SC, Solsperse 24000GR, Solsperse 2000, Solsperse 27000, Solsperse 28000, Solsperse 3000, Solsperse 300, Solsperse 38500 (Solsperse is registered trademark) manufactured by Avecia; and trade name DISPARLON DA70350, DISPARLON DA705, DISPARLON DA725, DISPARLON DA860, DISPARLON DA873N and the like (DISPARLON is registered trademark) manufactured by Kusumoto Chemicals, Ltd. Regarding the state of the polymeric dispersant at ambient temperature, any of liquid, solid, and gelatinous dispersants can be used.

When a polycarbonate resin is used for the solar radiation shielding resin formed body, a powder solar radiation shielding fine particle dispersion body is added to dihydric phenol which is a raw material of the resin, and the resultant is melted and mixed. Reaction with a carbonate precursor exemplified by phosgene can produce a solar radiation shielding fine particle dispersion body including the solar radiation shielding fine particles uniformly dispersed in the resin. When an acrylic resin is used for the solar radiation shielding resin formed body, liquid solar radiation shielding fine particle dispersion body is added to methyl methacrylate, ethyl methacrylate, propyl methacrylate, butyl methacrylate, or the like which is a raw material of the acrylic resin, and the resultant is uniformly mixed by a known method. Polymerization by known method such as suspension polymerization or bulk polymerization can produce a solar radiation shielding fine particle dispersion body including the solar radiation shielding fine particles uniformly dispersed in the acrylic resin.

In addition, a method can be employed in which the solar radiation shielding fine particles containing calcium lanthanum boride fine particles which are not subjected to dispersion treatment are directly added to a thermoplastic resin and uniformly melted and mixed. In other words, it is sufficient that the calcium lanthanum boride fine particles are uniformly dispersed in the thermoplastic resin. Therefore, a method is not limited to the above-described methods.

[d] Solar Radiation Shielding Fine Particle-Containing Masterbatch and Method for Production Thereof In order to produce a solar radiation shielding fine particle-containing masterbatch using the liquid or powder solar radiation shielding fine particle dispersion body obtained by the above-described production method, any method can be used so long as the solar radiation shielding fine particles can be uniformly dispersed in the thermoplastic resin.

For example, the method in which the solar radiation shielding fine particle dispersion body and the thermoplastic resin powder or pellets, and other additives as necessary, are uniformly melted and mixed using a mixer such as a ribbon blender, a tumbler, a Nauta mixer, a Henschel mixer, a super mixer, a planetary mixer, and a kneading machine such as a Banbury mixer, a kneader, a roll, a kneader ruder, a single-screw extruder, a twin-screw extruder, while removing the solvent can be used to prepare a mixture including the solar radiation shielding fine particles uniformly dispersed in the thermoplastic resin. Further, it is also possible to prepare the mixture in which the solar radiation shielding fine particles are uniformly dispersed in a thermoplastic resin, using the method of removing the solvent from the solar radiation shielding fine particle dispersion body containing the calcium lanthanum boride fine particles by a known method, and uniformly melting and mixing the obtained powder and the thermoplastic resin powder and granular or pellets and, if necessary, other additives.

The solar radiation shielding fine particle-containing masterbatch according to the present invention can also be compounded with a general additive. For example, dyes, pigments generally used for coloring thermoplastic resins, such as azo-based dye, cyanine-based dye, quinoline-based, perylene-based dye, carbon black can be compounded to impart arbitrary color tone to the masterbatch as necessary. In addition, hindered phenol-based, phosphorus-based stabilizer; mold-releasing agents; hydroxybenzophenone-based, salicylic acid-based, HALS-based, triaozole-based, triazine-based UV absorbers, coupling agents, surfactants, antistatic agents, or the like may be compounded in an effect-developing amount.

The solar radiation shielding fine particle-containing masterbatch according to the present invention can be obtained, by kneading the thus-obtained mixture with a pent-type single-screw or twin-screw extruder, and processing it into pellets.

The pellets can be obtained by the most general method of cutting melt-extruded strands. Accordingly, examples of their shape include a cylinder and a prism. Further, a so-called hot cut method can be employed which directly cuts the melt-extrudate. In such a case, the pellet generally takes a shape close to a sphere.

As described above, the solar radiation shielding fine particle-containing masterbatch according to the present invention can employ any form or shape. However, it is preferable to employ the same form and shape as those of the thermoplastic resin forming material used for diluting the masterbatch containing the solar radiation shielding fine particles when forming the solar radiation shielding resin formed body.

In the solar radiation shielding fine particle-containing masterbatch according to the present invention, the content of the solar radiation shielding fine particles with respect to the thermoplastic resin is 0.01 parts by mass or more and 20 parts by mass or more, and more preferably, 0.1 parts by mass or more and 10 parts by mass or less, with respect to 100 parts by mass of the thermoplastic resin. With the content of the solar radiation shielding fine particles of 20 parts by mass or less with respect to 100 parts by mass of the thermoplastic resin, no aggregation of the solar radiation shielding fine particles occurs, and sufficient dispersion of the solar radiation shielding fine particles in the resin is attained. Therefore, the haze value of the formed transparent solar radiation shielding resin formed body is suppressed. Further, the generation of uneven dilution is suppressed when the solar radiation shielding fine particle-containing masterbatch is diluted and kneaded with the thermoplastic resin forming material.

On the other hand, when the content of the solar radiation shielding fine particles is 0.01 mass parts by weight or more with respect to 100 parts by mass of the thermoplastic resin, even a transparent resin film formed body to be formed of 100 μm or less can provide sufficient solar radiation shielding ability, depending on the thickness of the solar radiation shielding transparent resin formed body to be formed.

The thermoplastic resin used for the solar radiation shielding fine particle-containing masterbatch according to the present invention is not particularly limited as long as it is a transparent thermoplastic resin having a high light transmittance in a visible light region. For example, examples of a 3 mm-thick plate-like formed body include a formed body having the visible light transmittance of 50% or more according to JIS R3106 and a haze value of 30% or less according to JIS K7105.

Specifically, one kind resin selected from the resin group including polycarbonate resin, (meth)acrylic resin, polyetherimide resin, polyester resin, polystyrene resin, (meth)acrylic—styrene copolymer (MS resin), polyether sulfone resin, fluorine-based resin, vinyl resin, and polyolefin resin, or a mixture of two or more kinds of resins selected from the resin group, or a copolymer of two or more kinds of resins selected from the resin group can be preferably mentioned.

For the purpose of applying the solar radiation shielding resin formed body formed with the above-described solar radiation shielding fine particle-containing masterbatch to window material for various buildings and vehicles, acrylic resin, polycarbonate resin, polyetherimide resin, and fluorine-based resin are more favored considering transparency, impact resistance, weather resistance, and the like.

Hereafter, typical resins will be described in the following order: (1) Polycarbonate resin, (2) Acrylic resin, (3) Polyester resin, (4) Polyetherimide resin, (5) Polystyrene resin, (6) (Meth)acrylic-styrene copolymer (MS resin), (7) Fluorine-based resin, (8) Vinyl resin, (9) Polyolefin resin.

(1) Polycarbonate Resin

As polycarbonate resins, aromatic polycarbonates are preferred.

Further, examples of the aromatic polycarbonate preferably include a polymer obtained by a known method such as interfacial polymerization, melt polymerization, or solid phase polymerization, from one or more kinds of dihydric phenolic compound typified by 2,2-bis(4-hydroxyphenyl)propane, 2,2-bis(3,5-dibromo-4-hydroxyphenyl)propane, and phosgene or a carbonate precursor typified by diphenyl carbonate.

Examples of dihydric phenolic compound include, for example, bis(hydroxyaryl)alkanes such as bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-3-methylphenyl)propane, 2,2-bis(4-hydroxy-3,5-dimethylphenyl)propane, 1,1-bis(4-hydroxy-t-butylphenyl)propane, 2,2-bis(4-hydroxy-3-bromophenyl)propane, 2,2-bis(4-hydroxy-3,5-dibromophenyl)propane; bis(hydroxyaryl)cycloalkanes such as 1,1-bis(4-hydroxyphenyl)cyclopentane, 1,1-(4-hydroxyphenyl)cyclohexane; dihydroxyaryl ethers such as 4,4'-dihydroxy diphenyl ether, bis(4-hydroxy-3-methylphenyl)ether; dihydroxydiaryl sulfides such as 4,4'-dihydroxydiphenyl sulfide, bis(4-hydroxy-3-methylphenyl)sulfide; dihydroxydiaryl sulfoxides such as 4,4'-dihydroxydiphenyl sulfoxide, bis(4-hydroxy-3-methylphenyl)sulfoxide; dihydroxydiaryl sulfones such as 4,4'-dihydroxydiphenylsulfone, bis(4-hydroxy-3-methylphenyl)sulfone; 4,4-biphenol, and the like. In addition, for example, resorcin, and substituted resorcinss such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafluororesorcin, 2,3,4,6-tetrabromoresorcin, and the like; catechol; hydroquinone, and substituted hydroquinones such as 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluorohydroquinone, 2,3,5,6-tetrabromhydroquinone, and the like, and 2,2,2',2'-tetrahydro-3,3,3',3'-tetramethyl-1,1'-spirobis(1H-indene)-7,7' dio 1 and the like may also be used. These dihydric phenolic compound may be used alone or in a combination of two or more kinds thereof.

Examples of the phosgene or the carbonate precursor typified by diphenyl carbonate, to be reacted with such a dihydric phenolic compound is not particularly limited, and include, for example, ditolyl carbonate, bis(chlorophenyl)carbonate, m-cresyl carbonate, dinaphthyl carbonate, bis(diphenyl)carbonate, diethyl carbonate, dimethyl carbonate, dibutyl carbonate, dicyclohexyl carbonate, and the like, but not limited thereto. Preferably, diphenyl carbonate is used. Such a carbonate precursor may also be used alone or in a combination of two or more kinds thereof.

In producing the polycarbonate, dicarboxylic acid or dicarboxylate ester may be contained as an acid component. Examples of dicarboxylic acid and dicarboxylate ester may include aromatic dicarboxylic acids such as terephthalic acid, isophthalic acid, diphenyl terephthalate, diphenyl isophthalate; aliphatic dicarboxylic acids such as succinic acid, glutaric acid, adipic acid, pimelic acid, suberic acid, azelaic acid, sebacic acid, decanedioic acid, dodecanedioic acid, diphenyl sebacate, diphenyl decanedioate, diphenyl dodecanedioate; alicyclic dicarboxylic acids such as cyclopropanedicarboxylic acid, 1,2-cyclobutanedicarboxylic acid, 1,3-cyclobutanedicarboxylic acid, 1,2'-cyclopentanedicarboxylic acid, 1,3-cyclopentanecarboxylic acid, 1,2-cyclohexanedicarboxylic acid, 1,3-cyclohexanedicarboxylic acid, 1,4-cyclohexanedicarboxylic acid, diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-cyclohexanedicarboxylate, diphenyl 1,4-cyclohexanedicarboxylate. Such dicarboxylic acid or dicarboxylate ester may also be used alone or in a combination of two or more kinds thereof. The dicarboxylic acid or dicarboxylate ester is contained in the carbonate precursor preferably in an amount of 50 mol % or less, and more preferably 30 mol % or less.

In producing polycarbonate, polyfunctional compounds having 3 or more functional groups in a molecule can be used. As such polyfunctional compounds, compounds having a phenolic hydroxyl group or carboxyl are preferred. In particular, compounds having 3 phenolic hydroxyl groups are preferred.

(2) Acrylic Resin

Examples of acrylic resin include polymers or copolymers obtained from methyl methacrylate, ethyl methacrylate, propyl methacrylate, or butyl methacrylate as a main raw material, using acrylate ester having $C_1$ to $C_8$ alkyl group, vinyl acetate, styrene, acrylonitrile, methacrylonitrile or the like as a copolymerizable component as necessary. Further, the acrylic resin polymerized in several stages can also be used.

(3) Polyester Resin

Examples of polyester resin include resins obtained by polymerization of a dicarboxylic acid compound and/or an ester-forming derivative of a dicarboxylic acid, and a diol compound and/or an ester-forming derivative of a diol compound. Specific examples include polyethylene terephthalate, polypropylene terephthalate, polybutylene terephthalate, polyhexamethylene terephthalate, polycyclohexane-1,4-dimethyl terephthalate, neopentyl terephthalate, polyethylene isophthalate, polyethylene naphthalate, polybutylene naphthalate, polyhexamethylene naphthalate, and the like, or copolymerized polyester thereof. They may also be used alone or in a combination of two or more kinds thereof.

(4) Polyetherimide Resin

A polyetherimide resin is not particularly limited so long as it is a polymer containing aliphatic, alicyclic, or aromatic ether unit and cyclic imide group as repeating units, and having melt-formability. A polyetherimide main chain may further contain cyclic imide, a structural unit other than an ether bond, for example, aromatic, aliphatic, alicyclic ester unit, oxycarbonyl unit, or the like to the extent of not blocking the effect of the present invention.

(5) Polystyrene Resin

Polystyrene resins are polymer obtained by polymerization of aromatic vinyl monomers, or copolymer obtained by copolymerization of aromatic vinyl monomers and other vinyl monomer copolymerizable therewith. Examples of the aromatic vinyl monomer include styrene, o-methylstyrene, p-methylstyrene, m-methylstyrene, α-methylstyrene, 2,4-dimethylstyrene, monochlorostyrene, dichlorostyrene, monobromostyrene, dibromostyrene, tribromostyrene, p-t-butylstyrene, ethylstyrene, divinylbenzene, and the like.

Among them, styrene and α-methylstyrene are preferably used because of easy reaction and availability. They may be used alone or in a combination of two or more thereof.

(6) (Meth)Acrylic-Styrene Copolymer (MS Resin)

(Meth)acrylic-styrene copolymer (MS resin) is, for example, a copolymer of (meth)acrylic acid alkyl ester and aromatic vinyl monomer such as styrene. Examples of (meth)acrylic acid alkyl ester include methyl methacrylate, ethyl methacrylate, n-butyl methacrylate, i-butyl methacrylate, t-butyl acrylate, 2-ethylhexyl methacrylate, stearyl methacrylate, methyl acrylate, ethyl acrylate, n-butyl acrylate, i-butyl acrylate, t-butyl acrylate, 2-ethylhexyl acrylate, stearyl acrylate and the like. They are used alone or in combination of two or more of them.

(7) Fluorine-Based Resin

Examples of fluorine-based resin include ethylene polyfluoride, polyethylene difluoride, polyethylene tetrafluoride, ethylene-ethylene difluoride copolymer, ethylene-ethylene tetrafluoride copolymer, ethylene tetrafluoride-perfluoroalkoxyethylene copolymer, and the like. In addition, tetrafluoroethylene-perfluoro(alkylvinylether) copolymer, tetrafluoroethylene-hexafluoropropylene copolymer, ethylene-tetrafluoroethylene copolymer, ethylene-chlorotrifluoroethylene copolymer, polychlorotrifluoroethylene polymer, polyvinylidene fluoride, vinyl fluoride, or the like can be used.

(8) Vinyl Resin

Examples of vinyl base resin include vinyl acetal typified by polyvinyl butyral, polyvinyl chloride, vinyl chloride-ethylene copolymer, vinyl chloride-ethylene-glycidyl methacrylate copolymer, vinyl chloride-ethylene-glycidyl acrylate copolymer, vinyl chloride-glycidyl methacrylate copolymer, vinyl chloride-glycidyl acrylate copolymer, polyvinylidene chloride, vinylidene chloride-acrylonitrile copolymer, polyvinyl acetate ethylene-vinyl acetate copolymer, or a mixture of polyvinyl acetal and polyvinyl butyral, and the like.

(9) Polyolefin Resin

Examples of polyolefin resin include homopolymers of α-olefins containing ethylene, copolymers of two or more kinds of α-olefins (any copolymer such as random, block, graft, etc.), or olefin-based elastomers. Examples of the ethylene homopolymer include low-density polyethylene (LDPE), high-density polyethylene (HDPE), and linear low-density polyethylene (LLDPE). The propylene polymer is not limited to the propylene homopolymer, but includes a propylene-ethylene copolymer. The olefinic elastomer is a copolymer of ethylene and one or more kinds of α-olefin other than ethylene (e.g., propylene, 1-butene, 1-hexene, 4-methyl-1-pentene). Examples include ethylene-propylene copolymer (EPR), ethylene butene copolymer (EBR), ethylene-propylene-diene copolymer (EPDM), and the like.

[e] Solar Radiation Shielding Resin Formed Body and Method for Production Thereof The solar radiation shielding resin formed body according to the present invention can be obtained by diluting and kneading the solar radiation shielding fine particle-containing masterbatch obtained by the above-described method and a thermoplastic resin forming material of the same kind as the thermoplastic resin contained in the solar radiation shielding fine particle-containing masterbatch, or a different kind of a thermoplastic resin having compatibility with the thermoplastic resin contained in the solar radiation shielding fine particle-containing masterbatch, and further forming into a predetermined shape.

Regarding the shape, the transparent solar radiation shielding resin formed body can be formed into an arbitrary shape as needed, for example, can be formed into a flat or curved shape. The thickness of the transparent solar radiation shielding resin formed body can be adjusted to an arbitrary thickness, from a plate to a sheet, as needed. Further, a resin sheet which is obtained by forming the transparent solar radiation shielding resin formed body into a flat shape can be formed into an arbitrary three dimensional shape such as a sphere by post-processing.

Examples of the forming method of the transparent solar radiation shielding resin formed body include arbitrary methods such as injection molding, extrusion molding, compression molding, or rotational molding. In particular, a method for obtaining a formed product by injection molding and a method for obtaining a formed product by extrusion molding are suitably employed. Examples of a method for obtaining a plate-like or film-like formed product by extrusion molding include a method which produces by withdrawing a molten thermoplastic resin extrudate using an extruder such as a T-die while cooling.

The formed product by injection molding can be suitably used for window glass and body such as roof of automobiles, and the plate-like and film-like formed product obtained by extrusion molding can be suitably used for structures such as arcade and carport.

[f] Solar Radiation Shielding Resin Laminate and Method for Production Thereof

The solar radiation shielding resin formed body, obtained by the above-described production method, in which the solar radiation shielding fine particles containing the calcium lanthanum boride fine particles are uniformly dispersed in the thermoplastic resin can be used by itself for structural materials such as a window glass, an arcade, or the like. Furthermore, it can also be used for structural materials as an integrated solar radiation shielding resin laminate obtained by laminating it on a separate transparent formed body such as inorganic glass, resin glass, or resin film by an arbitrary method.

For example, since the solar radiation shielding resin formed body that is formed into a film in advance is laminated and integrated onto the inorganic glass by a heat lamination method, the solar radiation shielding resin laminate having the solar radiation shielding function and a scattering prevention function can be obtained. Further, the solar radiation shielding resin laminate can also be obtained by forming the solar radiation shielding resin formed body, and, at the same time, laminating and integrating it onto a separate transparent formed body, by a heat lamination method, a coextrusion method, a press molding method, an injection molding method, or the like. Since the formed bodies effectively exhibit their inherent advantages while mutually complementing the disadvantages, the solar radiation shielding resin laminate can be used as a more useful structural material.

Further, for example, onto a top surface or both surfaces of the solar radiation shielding polycarbonate resin formed body, obtained using the above-described solar radiation shielding fine particle-containing masterbatch and formed into a sheet, another polycarbonate sheet can be bonded as a cap layer for the purpose of protection therefor, which can be used as a solar radiation shielding resin laminate.

Polycarbonate resins generally have a large tendency to deteriorate, such as yellowing due to ultraviolet light. Therefore, a constitution in which a considerable amount of an ultraviolet absorber is added to the cap resin layer or the main body of the sheet resin serving as a core to suppress the influence of ultraviolet radiation is a method generally used industrially.

It is generally preferable that the cap layer has an average thickness of about 10 to 120 µm. For example, the thickness of the cap layer is more preferably about 15 to 100 µm. In another embodiment, the thickness of the cap layer is more preferably about 20 to 90 µm. In yet another embodiment, the thickness of the cap layer is more preferably about 25 to 80 µm.

In general, the solar radiation shielding resin laminate can be produced by extruding and forming the solar radiation shielding resin laminate, and then laminating sheets of the single-layer solar radiation shielding resin laminate by a roll mill or a roll stack to form a multi-layer sheet. Extrusion and formation of individual layer of the multilayer sheet can be performed by a single-screw extruder or a twin-screw extruder. Since the individual sheet of the single-layer is extruded by a single-screw extruder and formed to laminate these sheets with a roll mill, a solar radiation shielding resin laminate in which a plurality of sheet-like solar radiation shielding resin formed bodies are laminated can be produced.

More preferably, a plurality of sheet layers are co-extruded by a single-screw extruder or a twin-screw extruder, and these layers may be appropriately laminated by a roll mill. The roll mill may be a twin-roll mill or a triple-roll mill as desired. For the production of multilayer sheets, co-extrusion of a plurality of layers by a single-screw extruder is generally preferred.

On the surface of the above-described solar radiation shielding resin formed body or solar radiation shielding resin laminate, a solar radiation shielding layer or an ultraviolet absorbing film may be further formed. For example, a coating liquid of ITO fine particles or ATO fine particles dispersed in various binders is coated on the solar radiation shielding resin formed body or the solar radiation shielding resin laminate, and a solar radiation shielding layer may be further formed on the surface of the solar radiation shielding resin formed body or the solar radiation shielding resin laminate.

In addition, a coating liquid of a benzotriazole-based or benzophenone-based ultraviolet absorber dissolved in various binders is coated on the surface of the above-described solar radiation shielding resin formed body or solar radiation shielding resin laminate, and cured to form an ultraviolet radiation absorbing layer. Forming the ultraviolet absorbing film can further improve the weather resistance of the solar radiation shielding resin formed body or the solar radiation shielding resin laminate. In particular, in the case where the main component of the thermoplastic resin constituting the solar radiation shielding resin formed body or the solar radiation shielding resin laminate is a resin which is greatly deteriorated by ultraviolet radiation such as polycarbonate, for example, organic ultraviolet absorber such as benzotriazole-based, benzophenone-based, or triazine-based ultraviolet absorber or inorganic ultraviolet absorbing fine particles such as zinc oxide, iron oxide, cerium oxide can be dispersed and contained in the solar radiation shielding resin formed body or solar radiation shielding resin laminate, or a resin sheet which is a cap layer tightly bonded to the solar radiation shielding resin formed body or solar radiation shielding resin laminate to greatly increase the life of the solar radiation shielding resin formed body or the solar radiation shielding resin laminate as a main body.

In the above-described solar radiation shielding resin laminate, the resin raw material of the resin formed body to be laminated without containing solar radiation shielding fine particles is not particularly limited as long as it is a colorless and transparent resin having a transmission property with less scattering. For example, besides polycarbonate resin, acrylic resin, fluorine-based resin, polyester resin, polyvinyl acetal resin, polyvinyl butyral resin, ethylene-vinyl acetate copolymer resin, and polyolefin-based resin, vinyl chloride resin, vinyl fluoride resin, and the like can be preferably used as necessary.

Hereafter, typical resins will be described in the following order: (1) Polycarbonate resin, (2) Acrylic resin, (3) Polyetherimide resin, (4) Fluorine-based resin, (5) Polystyrene resin, and (6) Summary.

(1) Polycarbonate Resin

A polycarbonate resin can be obtained by reacting dihydric phenols and a carbonate-based precursor by a solution method or melting method.

Typical examples of dihydric phenol include 2,2-bis(4-hydroxyphenyl)propane [bisphenol A], 1,1-bis(4-hydroxyphenyl)ethane, 1,1-bis(4-hydroxyphenyl)cyclohexane, 2,2-bis(4-hydroxy-3,5-dimethylphenyl)propane, 2,2-bis(4-hydroxy-3,5-dibromophenyl)propane, 2,2-bis(4-hydroxy-3-methylphenyl)propane, bis(4-hydroxyphenyl)sulfide, bis(4-hydroxyphenyl)sulfone, and the like. Further, the dihydric phenol is bis(4-hydroxyphenyl)alkane-based, and particularly preferably contains bisphenol A as a main component.

(2) Acrylic Resin

As the acrylic resin, polymers or copolymers obtained from methyl methacrylate, ethyl methacrylate, propyl methacrylate, or butyl methacrylate as a main raw material, using, as necessary, acrylate ester having $C_1$ to $C_8$ alkyl group, vinyl acetate, styrene, acrylonitrile, methacrylonitrile or the like as a copolymerizable component are used. Further, the acrylic resin polymerized in several stages can also be used.

(3) Polyetherimide Resin

A polyetherimide resin is not particularly limited so long as it is a polymer containing aliphatic, alicyclic, or aromatic ether unit and cyclic imide group as repeating units, and having melt-formability. A polyetherimide main chain may further contain cyclic imide, a structural unit other than an ether bond, for example, aromatic, aliphatic, alicyclic ester unit, oxycarbonyl unit, or the like to the extent of not blocking the effect of the present invention.

(4) Fluorine-Based Resin

A fluorine-based resin may be any resin as long as it contains fluorine in a molecular structure. Examples include ethylene tetrafluoride resin, ethylene trifluoride resin, ethylene difluoride resin, ethylene monofluoride resin, and a mixture thereof.

(5) Polyester Resin

As a polyester resin, a linear saturated polyester resin obtained by polycondensation of an acid component and a diol component, specifically, polyethylene terephthalate, polyethylene naphthalate, and the like can be used. As the acid component, one or two or more kinds of saturated dibasic acids such as phthalic acid, phthalic anhydride, sebacic acid, azelaic acid, dimer acid and the like can be used, and, as the diol component, one or two or more kinds of ethylene glycol, propylene glycol, decane diol, dodecane diol, hexadecane diol, bisphenol compound and ethylene oxide or propylene oxide adduct thereof, and the like can be used.

(6) Summary

Using the above-described solar radiation shielding fine particles containing the calcium lanthanum boride fine particles as a solar radiation shielding component, and using the solar radiation shielding fine particle-containing master-batch according to the present invention uniformly dispersed in a thermoplastic resin component can provide the solar radiation shielding resin formed body which is formed into a sheet. This method can provide the solar radiation shielding resin formed body, solar radiation shielding resin laminate having solar radiation shielding function and high transmission property in the visible light region without using a high-cost physical film formation method or complicated adhesion steps.

Further, as described above, the calcium lanthanum boride fine particles used in the present invention have a higher infrared absorption coefficient than ordinary organic pigments and can exhibit an infrared shading effect when added in a small amount. Thus, material costs can be reduced. The calcium lanthanum boride fine particles according to the present invention are generally preferably used in an amount of about 0.01 to 12.0 g/m$^2$ per unit area. Further, in another embodiment, it is more preferably used in an amount of about 0.3 to 6.0 g/m$^2$. In still another embodiment, it is more preferably used in an amount of about 0.5 to 3.5 g/m$^2$.

EXAMPLES

Hereinafter, the present invention will be specifically described with reference to examples. However, the present invention is not limited to the examples.

The optical properties were measured using a spectrophotometer U-4000 manufactured by Hitachi Co., Ltd., and calculated according to JIS R3106 to obtain the visible light transmittance VLT (wavelength, 380 to 780 nm) and the solar radiation transmittance ST (wavelength, 380 to 2600 nm).

The particle size distribution and the average particle size of the solar radiation shielding fine particles dispersed in the organic solvent were measured using Nanotrac model UPA-150 manufactured by Nikkiso Co., Ltd.

The haze value was measured using HR-200 manufactured by Murakami Color Research Laboratory.

In weather resistance test, the prepared solar radiation shielding resin formed body or solar radiation shielding resin laminate was loaded in the sunshine weatherometer (Ci4000, manufactured by ATLAS) operating according to the test cycle of ISO4892-2 for 500 hours, and the difference of the visible light transmittance before and after loading (ΔVLT) was measured and evaluated.

Example 1

Calcium oxide CaO, lanthanum dioxide $La_2O_3$, and boron carbide $B_4C$ were weighed such that Ca:La=0.26:0.74, (Ca+La):B=1:6 (atomic ratio), and the mixture was sufficiently mixed with a small-sized vacuum grinding machine (16-Z manufactured by ISHIKAWA KOJO Co., Ltd.) to obtain a mixed powder. The obtained mixed powder was put in a covered carbon crucible which can degas a product gas such as carbon oxide gas and moisture, and placed in a vertical vacuum baking furnace, and heated up at a rate of 300° C./h in vacuum. After holding at 1650° C. for 18 hours, the power of the furnace was turned off and the temperature was allowed to cool spontaneously to room temperature to obtain a powder.

An appearance of the obtained powder was dark blue purple, and the XRD measurement indicated a single-phase diffraction pattern of body-centered cubic phase which was the same as that of $LaB_6$. When composition analysis was performed by SEM-EDX, results around Ca:La:B=0.26: 0.74:6 (atomic ratio) were obtained almost uniformly among the particles. Accordingly, it was confirmed that particles having a $Ca_{0.26}La_{0.74}B_6$ composition were produced.

Two hundred grams of the obtained $Ca_{0.26}La_{0.74}B_6$ powder, 700 g ethylene glycol, and 300 g of a polyacrylate-based dispersant (solid content, 150 g) were weighed and charged in a paint shaker (manufactured by Asada Iron Works Co., Ltd.) containing 0.5 mmφ $ZrO_2$ beads, subjected to pulverization and dispersion treatment for 10 hours and temporarily collected. Then, pulverization and dispersion treatment was further performed using 0.1 mmφ $ZrO_2$ beads for 10 hours to prepare solar radiation shielding fine particle dispersion liquid A1. The average particle size of the $Ca_{0.26}La_{0.74}B_6$ powder in the obtained solar radiation shielding fine particle dispersion liquid A1 was 39 nm.

A small angle X-ray scattering method was employed, and relation between $q=4\pi \sin \theta/\lambda$ and the scattering intensity I (q) was double-logarithmically plotted to evaluate the fine particle shape of the $Ca_{0.26}La_{0.74}B_6$ composition in the solar radiation shielding fine particle dispersion liquid A1. As a result, Ve=−2.4 was obtained, and the shape was found to be strongly disc-like.

Further, the fine particle shape of the obtained $Ca_{0.26}La_{0.74}B_6$ was observed with a transmission electron microscope and the long and short axes of 50 particles were measured. As a result, the average shape was determined to be a disc-like cylinder or a disc-like spheroid with an aspect ratio d/h=12.7.

Next, the solar radiation shielding fine particles dispersion liquid A1 was diluted with ethylene glycol so that the concentration of the $Ca_{0.26}La_{0.74}B_6$ powder became 0.2 mass % to obtain a liquid solar radiation shielding fine particles dispersion body A2. In this liquid solar radiation shielding fine particle dispersion body A2, 0.75 parts by mass of the polymeric dispersant is contained with respect to 1 part by mass of the solar radiation shielding fine particles.

The solar radiation shielding fine particle dispersion body A3 which is a polyethylene terephthalate resin composition containing the solar radiation shielding fine particles was prepared by mixing 30 mass % of the liquid solar radiation shielding fine particle dispersion body A2 and 70 mass % of terephthalic acid, and further performing esterification and polycondensation in a high temperature vacuum mixing tank. This solar radiation shielding fine particle dispersion body A3 was uniformly melted and mixed with a blender and a twin-screw extruder (manufactured by Toyo Seiki Seisaku-Sho, Ltd.), and then extruded to a thickness of 50 μm using a T-die to form a sheet-like solar radiation shielding resin formed body in which the solar radiation shielding fine particles were uniformly dispersed in whole.

The content of $Ca_{0.26}La_{0.74}B_6$ fine particles contained in the sheet-like solar radiation shielding resin formed body was 0.30 g/m$^2$.

After slightly polishing the surface of the obtained solar radiation shielding resin formed body, optical properties were measured using the above-described measurement method. The result showed a transmission profile in which the transmittance in the visible light region was high and a valley was present due to strong absorption at a wavelength around 1233 nm in the near-infrared region. The visible light transmittance was 56.2%, the solar radiation transmittance was 32.4%, and the haze was 1.4%.

That is, it was found to be a transparent sheet having a very strong infrared absorption and being bright and free from fogging. The change in the visible light transmittance (transmittance difference) after 500 h with the weatherometer was 1.4%, indicating that the sheet had sufficient practical weather resistance.

Tables 1A to 3 illustrate the composition and production conditions of the solar radiation shielding fine particles dispersion liquid, the solar radiation shielding fine particle dispersion body and the solar radiation shielding fine particles masterbatch according to Example 1 described above, and the production conditions, structure, and optical properties of the solar radiation shielding resin laminate according to Example 1.

Tables 1A to 3 illustrate similarly for Examples 2 to 6 and Comparative Examples 1 and 2.

Example 2

Seventy five grams of the calcium lanthanum boride $Ca_{0.26}La_{0.74}B_6$ powder obtained in Example 1, 850 g of toluene, and an appropriate amount of a polyacrylate-based polymeric dispersant (solid content: 50 mass %) were mixed, and mixed in a bead mill (manufactured by Ashizawa Finetech Ltd.) using $ZrO_2$ beads with a diameter of 0.3 mm for 5 hours to prepare a solar radiation shielding fine particle dispersion liquid B 1 (calcium lanthanum boride fine particles dispersion liquid ($Ca_{0.26}La_{0.74}B_6$ concentration, 6.5 mass %)). The average particle size of the $Ca_{0.26}La_{0.74}B_6$ powder in the solar radiation shielding fine particle dispersion liquid B1 was 46 nm.

A small-angle X-ray scattering method was employed, and relation between $q=4\pi \sin \theta/\lambda$ and the scattering intensity I (q) was double-logarithmically plotted to evaluate the particle shape of the $Ca_{0.26}La_{0.74}B_6$ composition. As a result, Ve=−3.2 was obtained, and the shape was found to be strongly disc-like.

Further, the particle shape of the obtained $Ca_{0.26}La_{0.74}B_6$ was observed with a transmission electron microscope and the long and short axes of 50 particles were measured. As a result, the average shape was determined to be a disc-like cylinder or a spheroid with an aspect ratio d/h=7.0.

Further, a polyacrylate-based polymeric dispersant (solid content: 50 mass %) and toluene were added to 500 g of the dispersion liquid B1, so that the total amount of the dispersion liquid was 695 g. Then, the solvent was completely removed under reduced pressure at 60° C. while stirring, to obtain a solar radiation shielding fine particle dispersion body B2 ($Ca_{0.26}La_{0.74}B_6$ concentration, 25 mass %) according to Example 2. The mixing ratio of the polymeric dispersant is 3.0 parts by mass with respect to 1 part by mass of $Ca_{0.26}La_{0.74}B_6$.

The obtained solar radiation shielding fine particle dispersion body B2 was added to a polycarbonate resin powder as a thermoplastic resin (the dispersion B2 was 0.0383 mass % and the polycarbonate resin was 99.9617 mass %), and the mixture was uniformly mixed with a blender. Then, the mixture was melt-kneaded by a twin-screw extruder, extruded and molded to a thickness of 2.0 mm using a T-die to form a sheet-like solar radiation shielding resin formed body in which the calcium lanthanum boride fine particles were uniformly dispersed throughout the resin. At this time, the addition amount of the $Ca_{0.26}La_{0.74}B_6$ fine particles in the resin sheet is 0.23 g/m².

After slightly polishing the surface of the obtained solar radiation shielding resin formed body, optical properties were measured. As a result, similarly to Example 1, a transmission profile in which the transmittance in the visible light region was high and a valley was present due to strong absorption at a wavelength of around 1233 nm in the near-infrared region was obtained. The visible light transmittance was 61.9%, the solar radiation transmittance was 38.3%, and the haze value was 1.6%. That is, it was found to be a transparent sheet having a very strong infrared absorption and being bright and free from fogging.

The change in the visible light transmittance (transmittance difference) after 500 hours with the weatherometer was 1.6%, indicating that the sheet had sufficient practical weather resistance.

Example 3

Calcium oxide CaO, lanthanum dioxide $La_2O_3$, and sodium borohydride $NaBH_4$ were weighed such that Ca:La=1:1, (Ca+La):B=1:6 (atomic ratio), and the mixture was sufficiently mixed using a small-sized vacuum grinding machine (16-Z manufactured by ISHIKAWA KOJO Co., Ltd.) to obtain a mixed powder. The obtained mixed powder was placed in a carbon crucible with a lid, placed in a vertical vacuum firing furnace, and heated at a rate of 300° C./hour in vacuum. After the temperature was maintained at 1250° C. for 4 hours, the power of the furnace was turned off and the temperature was naturally lowered to obtain a powder.

An appearance of the obtained powder was dark blue purple, and the XRD measurement indicated a single-phase diffraction pattern of body-centered cubic single phase which was the same as that of $LaB_6$. When composition analysis was performed by SEM-EDX, results of around Ca:La:B=1:1:12 (atomic ratio) were obtained almost uniformly among the particles. Accordingly, it was confirmed that particles having a $Ca_{0.5}La_{0.5}B_6$ composition were produced.

75 g of the obtained calcium lanthanum boride $Ca_{0.5}La_{0.5}B_6$ powder, 850 g of toluene, and an appropriate amount of a polyacrylate-based polymeric dispersant (solid content: 50 mass %) were mixed, and mixed in a bead mill (manufactured by Ashizawa Finetech Ltd.) using $ZrO_2$ beads with a diameter of 0.3 mm for 5 hours to prepare a calcium lanthanum boride fine particle dispersion liquid C1 ($Ca_{0.5}La_{0.5}B_6$ concentration, 6.5 mass %). The average particle size of the $Ca_{0.5}La_{0.5}B_6$ powder in the calcium lanthanum boride fine particle dispersion liquid C1 was 36 nm.

A small angle X-ray scattering method was employed, and relation between $q=4\pi \sin \theta/\lambda$ and the scattering intensity I (q) was double-logarithmically plotted to evaluate the particle shape. Ve=−3.3 was obtained, and the shape was found to be strongly disc-like.

The particle shape of the obtained $Ca_{0.5}La_{0.5}B_6$ was observed with a transmission electron microscope and the long and short axes of 50 particles were measured. As a result, the average shape was determined to be a disc-like cylinder or a spheroid with an aspect ratio d/h=5.2.

A polyacrylate-based polymeric dispersant (solid content: 50 mass %) and toluene were added to 500 g of the calcium lanthanum boride fine particle dispersion liquid C1, so that the total amount of the dispersion liquid was 840 g. Then, the solvent was completely removed under reduced pressure at 60° C. while stirring, to obtain a solar radiation shielding fine particle dispersion body C2 ($Ca_{0.5}La_{0.5}B_6$ concentration, 21.31 mass %) according to Example 3. The mixing ratio of the polymeric dispersant is 7.4 parts by mass with respect to 1 part by mass of $Ca_{0.5}La_{0.5}B_6$.

The obtained solar radiation shielding fine particle dispersion body C2 was added to a polycarbonate resin powder as a thermoplastic resin (the dispersion C2 was 0.0508 mass % and the polycarbonate resin was 99.9492 mass %), and the mixture was uniformly mixed with a blender. Then, the mixture was melt-kneaded by a twin-screw extruder, extruded and molded to a thickness of 2.0 mm using a T-die to form a sheet-like solar radiation shielding resin formed body in which the calcium lanthanum boride fine particles were uniformly dispersed in whole.

At this time, the addition amount of the $Ca_{0.5}La_{0.5}B_6$ fine particles in the resin sheet is 0.26 g/m².

Ten mass % of benzotriazole (UV absorber) and 90 mass % of a polycarbonate resin powder containing a small amount of initiator were mixed and uniformly mixed with a blender. Then, the mixture was melt-kneaded by a single-screw extruder, extruded and molded to a thickness of 70 μm using a T-die to form a sheet-like polycarbonate resin formed body to be a cap layer.

Both the obtained sheet in which the calcium lanthanum boride fine particles were uniformly dispersed and the sheet to be a cap layer were passed through a roller and stuck together to obtain a two-layered solar radiation shielding resin formed body.

The surface of the two-layered solar radiation shielding resin formed body was slightly polished and optical properties were measured. As a result, a transmission profile was obtained in which the transmittance in the visible light region was high and a valley was present due to strong absorption at a wavelength around 1515 nm in the near-infrared region. The visible light transmittance was 58.4%, the solar radiation transmittance was 38.8%, and the haze value was 1.8%. That is, it was found to be a transparent sheet having a very strong infrared absorption and being bright and free from fogging.

The change in the visible light transmittance (transmittance difference) after 500 hours with the weatherometer was as small as 0.3%, indicating that the sheet had sufficient practical weather resistance. In the weatherometer test, the UV radiation was allowed to enter from the cap layer side.

Example 4

In the same manner as in Example 3, a solar radiation shielding fine particle dispersion body C2 was obtained. The solar radiation shielding fine particle dispersion body C2 was added to a polycarbonate resin powder (the dispersion C2 was 0.0547 mass % and the polycarbonate resin was 99.9453 mass %), and the mixture was uniformly mixed with a blender. Then, the mixture was melt-kneaded by a twin-screw extruder, extruded and molded to a thickness of 2.0 mm using a T-die to form a sheet-like solar radiation shielding resin formed body in which the solar radiation shielding fine particles were uniformly dispersed in whole.

At this time, the addition amount of the $Ca_{0.5}La_{0.5}B_6$ fine particles in the resin sheet is 0.28 g/m².

Ten mass % of benzotriazole (UV absorber) and 90 mass % of a polycarbonate resin powder containing a small amount of initiator were mixed and uniformly mixed with a blender. Then, the mixture was melt-kneaded by a single-screw extruder, extruded and molded to a thickness of 70 μm using a T-die to form a sheet-like polycarbonate resin formed body to be a cap layer.

The obtained sheet in which the calcium lanthanum boride fine particles were uniformly dispersed was sandwiched between the sheets to be a cap layer, and passed through a roller and bonded together to obtain a three-layered solar radiation shielding resin formed body.

The surface of the three-layered solar radiation shielding resin formed body was slightly polished and optical properties were measured. As a result, a transmission profile was obtained in which the transmittance in the visible light region was high and a valley was present due to strong absorption at a wavelength around 1515 nm in the near-infrared region. The visible light transmittance was 55.3%, the solar radiation transmittance was 34.6%, and the haze value was 2.1%. That is, it was found to be a transparent sheet having a very strong infrared absorption and being bright and free from fogging.

The change in the visible light transmittance (transmittance difference) after 500 hours with the weatherometer was as small as 0.3%, indicating that the sheet had sufficient practical weather resistance.

Example 5

Calcium oxide CaO, lanthanum dioxide $La_2O_3$, and sodium borohydride $NaBH_4$ were weighed such that Ca:La=3:1, (Ca+La):B=1:6 (atomic ratio), and the mixture was sufficiently mixed using a small-sized vacuum grinding machine (16-Z manufactured by ISHIKAWA KOJO Co., Ltd.) to obtain a mixed powder. The obtained mixed powder was placed in a carbon crucible with a lid, placed in a vertical vacuum firing furnace, and heated at a rate of 300° C./hour in vacuum. After the temperature was maintained at 1250° C. for 4 hours, the power of the furnace was turned off and the temperature was naturally lowered to obtain a powder.

An appearance of the obtained powder was blue purple, and the XRD measurement indicated a single-phase diffraction pattern of body-centered cubic phase which was the same as that of $LaB_6$. When composition analysis was performed by SEM-EDX, results of around Ca:La:B=3:1:24 (atomic ratio) were obtained almost uniformly among the particles. Therefore, it was confirmed that particles having a composition of $Ca_{0.75}La_{0.25}B_6$ could be produced.

260 g of the obtained calcium lanthanum boride $Ca_{0.75}La_{0.25}B_6$ powder and 1688 g of 2-propanol were mixed with stirring, to which was further added 52 g of a fluoroalkylsilane compound KBM-7103 (manufactured by GE Toshiba Silicone) to prepare a slurry. The slurry was subjected to pulverization and dispersion treatment in a medium stirring mill (horizontal cylindrical annular type, manufactured by Ashizawa Finetech Ltd.) together with $ZrO_2$ beads having diameter of 0.3 mm, to obtain the dispersion liquid D1 of calcium lanthanum boride fine particle covered with fluoroalkyl silane compound having an average particle size of 39 nm.

A small-angle X-ray scattering method was employed, and relation between $q=4\pi \sin \theta/\lambda$ and the scattering intensity I (q) was double-logarithmically plotted to evaluate the particle shape. Ve=−2.8 was obtained, and the shape was found to be strongly disc-like.

Further, the particle shape of the obtained $Ca_{0.5}La_{0.5}B_6$ was observed with a transmission electron microscope and the long and short axes of 50 particles were measured. As a result, the average shape was determined to be a disc-like cylinder or a spheroid with an aspect ratio d/h=6.9.

9.75 g of a liquid containing 40 mass % of BR-105 (manufactured by Mitsubishi Rayon Co., Ltd.) including poly (2-methylpropyl methacrylate) as an acrylic resin anti-aggregation agent in 2-propanol was added to 10 g of the dispersion liquid D1, and mixed to obtain a mixture.

2-Propanol was volatilized from the resulting mixture to obtain a dispersion body D2 in which a calcium lanthanum boride covered with a fluoroalkylsilane compound was uniformly dispersed in the acrylic resin anti-aggregation agent. This dispersion body D2 contained 3 parts by mass of the anti-aggregation agent with respect to 1 part by mass of the calcium lanthanum boride powder.

Dispersion D2 was added to an acrylic resin (manufactured by Sumitomo Chemical Co., Ltd.) so that the content of calcium lanthanum boride was 0.87 mass %, and the mixture was uniformly mixed. Then, the mixture was melt-kneaded with a twin-screw extruder, and the extruded strand having a diameter of 3 mm was cut into pellets to obtain a masterbatch containing calcium lanthanum boride and an acrylic resin as main components.

The obtained masterbatch was uniformly mixed with an acrylic resin (manufactured by Sumitomo Chemical Co., Ltd.), and then a 10 cm×5 cm, 2.0 mm thick sheet-like formed body was obtained with an injection molding machine using a T-die.

The mixing ratio of the masterbatch and the acrylic resin powder was adjusted so that the obtained 2.0 mm-thick sheet-like formed body contained 0.28 g/m$^2$ of calcium lanthanum boride fine particles $Ca_{0.75}La_{0.25}B_6$.

The surface of the obtained solar radiation shielding resin formed body was slightly polished and optical properties were measured. As a result, a transmission profile was obtained in which the transmittance in the visible light region was high and a valley was present due to strong absorption at a wavelength around 1813 nm in the near-infrared region. The visible light transmittance was 63.6%, the solar radiation transmittance was 45.5%, and the haze value was 1.5%. That is, it was found to be a transparent sheet having a very strong infrared absorption and being bright and free from fogging.

The change in the visible light transmittance (transmittance difference) after 500 hours with the weatherometer was as small as 2.4%, indicating that the sheet had sufficient practical weather resistance.

Example 6

In the same manner as in Example 4 using the calcium lanthanum boride $Ca_{0.75}La_{0.25}B_6$ powder used in Example 5, a three-layered solar radiation shielding resin formed body was obtained.

At this time, it was prepared such that the calcium lanthanum boride fine particles were contained in a 2.0 mm-thick sheet-like formed body at 0.33 g/m$^2$.

The surface of the three-layered solar radiation shielding resin formed body was slightly polished and optical properties were measured. As a result, similarly to Example 5, a transmission profile was obtained in which the transmittance in the visible light region was high and a valley was present due to strong absorption at a wavelength around 1813 nm in the near-infrared region. The visible light transmittance was 60.1%, the solar radiation transmittance was 43.2%, and the haze value was 1.7%. That is, it was found to be a transparent sheet having a very strong infrared absorption and being bright and free from fogging.

The change in the visible light transmittance (transmittance difference) after 500 h with the weatherometer was 0.4%, indicating that the sheet had sufficient practical weather resistance.

Comparative Example 1

Calcium oxide CaO, lanthanum dioxide $La_2O_3$, and boron carbide $B_4C$ were weighed such that Ca:La=1:19, (Ca+La):B=1:6 (atomic ratio), and the mixture was sufficiently mixed with a small-sized vacuum grinding machine (16-Z manufactured by ISHIKAWA KOJO Co., Ltd.) to obtain a mixed powder. The obtained mixed powder was placed in a carbon crucible with a lid capable of degassing generated gas such as carbon dioxide gas and moisture, placed in a vertical vacuum firing furnace, and heated at a rate of 300° C./hour in vacuum. After the temperature was maintained at 1650° C. for 18 hours, the power of the furnace was turned off and the temperature was naturally lowered to obtain a powder.

An appearance of the obtained powder was dark blue purple, and the XRD measurement indicated a single-phase diffraction pattern of body-centered cubic single phase which was the same as that of $LaB_6$.

When composition analysis was performed by SEM-EDX, results of around Ca:La:B=1:19:120 (atomic ratio) were obtained almost uniformly among the particles. Accordingly, it was confirmed that particles having a $Ca_{0.05}La_{0.95}B_6$ composition were produced.

Two mass % of the obtained $Ca_{0.05}La_{0.95}B_6$ particles and 98 mass % of IPA solvent were charged in a paint shaker (manufactured by Asada Iron Works Co., Ltd.), subjected to dispersion treatment for 24 hours using 1.0 mmφ stainless-steel beads and then dispersion/stabilization treatment with a small amount of a coupling agent to prepare a solar radiation shielding fine particle dispersion liquid F1.

The average particle size of the $Ca_{0.05}La_{0.95}B_6$ powder in the solar radiation shielding fine particle dispersion liquid F1 was 58 nm.

A small angle X-ray scattering method was employed, and relation between $q=4\pi \sin \theta/\lambda$ and the scattering intensity I (q) was double-logarithmically plotted to evaluate the particle shape. Ve=−1.4 was obtained, and the shape was found to be strongly disc-like. Further, the particle shape of the obtained $Ca_{005}La_{0.95}B_6$ in the dispersion liquid was observed with a transmission electron microscope. As a result, many rod-like or needle-like particles were observed, which means that the particles were not considered as disc-like cylinder or spheroidal.

In the same manner as in Example 2, except that thus obtained solar radiation shielding fine particle dispersion liquid F1 using the calcium lanthanum boride $Ca_{0.05}La_{0.95}B_6$ powder with low Ca content was used, a sheet-like solar radiation shielding resin formed body was obtained which mainly contained a solar radiation shielding fine particle dispersion body F2 and polycarbonate resin.

The surface of the obtained solar radiation shielding resin formed body was slightly polished and optical properties were measured. As a result, a transmission profile was obtained in which the transmittance in the visible light region was high and a valley was present due to strong absorption at a wavelength around 1078 nm in the near-infrared region. The visible light transmittance was 51.4%, the solar radiation transmittance was 38.6%, and the haze value was 2.0%. That is, the visible light transmittance was considerably lower than those of Examples 1 and 2. Further, this resin formed body was intensely green-colored, failing to provide neutral transparency.

Incidentally, the change in the visible light transmittance (transmittance difference) after 500 hours with the weatherometer was 1.7%, indicating that the sheet had sufficient practical weather resistance.

Comparative Example 2

Calcium oxide CaO, lanthanum dioxide $La_2O_3$, and boron carbide $B_4C$ were weighed such that Ca:La=9:1, (Ca+La):B=1:6 (atomic ratio), and the mixture was sufficiently mixed with a small-sized vacuum grinding machine (16-Z manufactured by ISHIKAWA KOJO Co., Ltd.) to obtain a mixed powder. The obtained mixed powder was placed in a carbon crucible with a lid capable of degassing generated gas such as carbon dioxide gas and moisture, placed in a vertical vacuum firing furnace, and heated at a rate of 300° C./hour in vacuum. After the temperature was maintained at 1650° C. for 18 hours, the power of the furnace was turned off and the temperature was naturally lowered to obtain a powder.

An appearance of the obtained powder was dark blue purple, and the XRD measurement indicated a single-phase diffraction pattern of body-centered cubic phase which was the same as that of $LaB_6$. When composition analysis was performed by SEM-EDX, results around Ca:La:B=9:1:60 (atomic ratio) were obtained almost uniformly among the particles. Accordingly, it was confirmed that particles having a $Ca_{0.9}La_{0.1}B_6$ composition were produced.

Two mass % of the obtained $Ca_{0.9}La_{0.1}B_6$ particles and 98 mass % of IPA solvent were charged in a paint shaker (manufactured by Asada Iron Works Co., Ltd.), subjected to dispersion treatment for 24 hours and then dispersion/stabilization treatment with a small amount of a coupling agent to prepare a solar radiation shielding fine particle dispersion liquid G1.

The average particle size of the $Ca_{0.9}La_{0.1}B_6$ powder in the solar radiation shielding fine particle dispersion liquid G1 was 32 nm.

A small angle X-ray scattering method was employed, and relation between $q=4\pi \sin \theta/\lambda$ and the scattering intensity I (q) was double-logarithmically plotted to evaluate the particle shape. Ve=−2.9 was obtained, and the shape was found to be strongly disc-like.

Further, the particle shape of the obtained $Ca_{0.9}La_{0.1}B_6$ was observed with a transmission electron microscope and the long and short axes of 50 particles were measured. As a result, the average shape was determined to be a disc-like cylinder or a spheroid with an aspect ratio d/h=9.1.

In the same manner as in Example 2, except that thus obtained solar radiation shielding fine particle dispersion liquid G1 using the calcium lanthanum boride $Ca_{0.9}La_{0.1}B_6$ powder with very high Ca content was used, a sheet-like solar radiation shielding resin formed body was obtained which mainly contained a solar radiation shielding fine particle dispersion body G2 and polycarbonate resin.

The surface of the obtained solar radiation shielding resin formed body was slightly polished and optical properties were measured. As a result, high transmittance in the visible light region and weak absorption in the infrared region were observed. The bottom of the transmittance due to absorption was apparently on the long wavelength side beyond 2600 nm. Therefore, FTIR measurement was employed to find that the absorption bottom was located at a wavelength around 2870 nm in the mid-infrared region. The visible light transmittance was 71.8%, the solar radiation transmittance was 65.1%, and the haze value was 2.1%. That is, this resin sheet had a weak infrared absorption effect, and the solar radiation transmittance was 20% or more larger than the sheet of the same composition according to the present invention when compared at the same transmittance. Note that the change in the visible light transmittance (transmittance difference) after 500 hours with the weatherometer was 2.4%, indicating that the sheet had sufficient practical weather resistance.

TABLE 1

| | | Solar radiation shielding fine particle dispersion liquid | | | | | |
|---|---|---|---|---|---|---|---|
| | | Solar radiation shielding fine particles | | | | | Dispersed |
| | | Fine particle shape | | | | | |
| | Composition | Ve | Aspect ratio d/h | Solvent | Polymeric dispersant | Covering material | particle size in dispersion liquid (nm) |
| Example 1 | Dispersion liquid A1 | $Ca_{0.26}La_{0.74}B_6$ 200g | −2.4 | 12.7 | Ethylene glycol 700 g | Polyacrylate-based dispersant 300 g (Solid content 150 g) | — | 39 |
| Example 2 | Dispersion liquid B1 | $Ca_{0.26}La_{0.74}B_6$ 75 g | −3.2 | 7.0 | Toluene 850 g | Polyacrylate-based dispersant (Solid content 50 mass %) | — | 46 |
| Example 3 | Dispersion liquid C1 | $Ca_{0.5}La_{0.5}B_6$ 75 g | −3.3 | 5.2 | | | — | 36 |
| Example 4 | Dispersion liquid C1 | | −3.3 | 5.2 | | | — | Same as above |
| Example 5 | Dispersion liquid D1 | $Ca_{0.75}La_{0.25}B_6$ 260 g | −2.8 | 6.9 | 2-Propanol 1688 g | — | Fluoroarlkyl silane compound: KBM-7103 52 g | 39 |
| Example 6 | Dispersion liquid E1 | $Ca_{0.75}La_{0.25}B_6$ 75 g | Same as above | Same as above | Toluene 850 g | Polyacrylate-based dispersant (Solid content 50 mass %) | — | 36 |
| Comparative Example 1 | Dispersion liquid F1 | $Ca_{0.05}La_{0.95}B_6$ 2 mass % | −1.4 | Rod-like particles Needle-like particles | IPA 98 mass % | — | Coupling gent small amount | 58 |
| Comparative Example 2 | Dispersion liquid G1 | $Ca_{0.9}La_{0.1}B_6$ 2 mass % | −2.9 | 9.1 | | | — | 32 |

TABLE 1-continued

|  |  | Solar radiation shielding fine particle dispersion body | | | |
|---|---|---|---|---|---|
|  |  | Solar radiation shielding fine particles | Resin material, dispersant |  | a |
|  | Example 1 | Dispersion body A2 | $Ca_{0.26}La_{0.74}B_6$ 0.2 mass % | Ethylene glycol | 0.75 parts by mass |
|  | Example 2 | Dispersion body B2 | $Ca_{0.26}La_{0.74}B_6$ 25 mass % | Polyacrylate-based dispersant (Solid content 50 mass %) | 3.0 parts by mass |
|  | Example 3 | Dispersion body C2 | $Ca_{0.5}La_{0.5}B_6$ 21.31 mass % |  | 7.4 parts by mass |
|  | Example 4 | Dispersion body C2 |  |  | Same as above |
|  | Example 5 | Dispersion body D2 | Dispersion liquid D1 10 g | Anti-aggregation agent Poly(2-methylpropyl methacrylate) 40 parts by mass + 2-propanol 9.75 g | — |
|  | Example 6 | Dispersion body E2 | $Ca_{0.75}La_{0.25}B_6$ 21.31 mass % | Polyacrylate-based dispersant (Solid content 50 mass %) | 7.4 parts by mass |
|  | Comparative Example 1 | Dispersion body F2 | $Ca_{0.05}La_{0.95}B_6$ 25 mass % | Polyacrylate-based dispersant (Solid content 50 mass %) | 3.0 parts by mass |
|  | Comparative Example 2 | Dispersion body G2 | $Ca_{0.9}La_{0.1}B_6$ 25 mass % |  | 3.0 parts by mass | a = Polymeric dispersant concentration (with respect to 1 part by mass of solar radiation shielding fine particles)

TABLE 2

|  |  | Solar radiation shielding fine particle dispersion body | | | |
|---|---|---|---|---|---|
|  |  | Solar radiation shielding fine particles [mass %] |  | Thermoplastic resin | b Shape |
| Example 1 | Dispersion body A3 | Dispersion body A2 30 | [(Added resin material) Terephthalic acid 70 mass %] | Polyethylene terephthalate resin | — |
| Example 2 | Dispersion body B3 | Dispersion body B2 0.0383 |  | Polycarbonate resin 99.9617 mass % | — |
| Example 3 | Dispersion body C3 | Dispersion body C2 0.0508 |  | Polycarbonate resin 99.9492 mass % | — |
| Example 4 | Dispersion body C3 | Dispersion body C2 0.0547 |  | Polycarbonate resin 99.9453 mass% | — |
| Example 5 | Dispersion body D3 | a |  | Acrylic resin | Strand (φ 3 mm) cut into pellets |
| Example 6 | Dispersion body E3 | Dispersion body E2 0.0547 |  | Polycarbonate resin 99.9453 mass % | — |
| Comparative Example 1 | Dispersion body F3 | Dispersion body F2 0.0383 |  | Polycarbonate resin 99.9617 mass % | — |
| Comparative Example 2 | Dispersion body G3 | Dispersion body G2 0.0383 |  |  | — |

TABLE 2-continued

Solar radiation shielding resin laminate

| | Solar radiation shielding resin formed body | | | Cap layer sheet | | | |
|---|---|---|---|---|---|---|---|
| | Production method | Shape | Content of solar radiation shielding fine particles [g/m²] | Production method | Shape [μm] | Component [mass %] | Structure |
| Example 1 | Twin-screw extruder T-die/ | Sheet 50 μm thickness | 0.30 | — | — | — | — |
| Example 2 | Extrusion molding | Sheet 20 mm thickness | 0.23 | — | — | — | — |
| Example 3 | | | 0.26 | e | Sheet 70 mm thickness | Polycarbonate resin benzotriazole 10 | Cap layer/ Solar radiation shielding resin formed body |
| Example 4 | | | 0.28 | | | | f |
| Example 5 | Injection molding machine T-die | d | 0.28 | — | — | — | — |
| Example 6 | c | Sheet 2.0 mm thickness | 0.33 | e | Sheet 70 mm thickness | Polycarbonate resin benzotriazole 10 | f |
| Comparative Example 1 | c | Sheet 2.0 mm thickness | 0.23 | — | — | — | — |
| Comparative Example 2 | | Same as above | | — | — | — | — | a = Dispersion body D2 (Solar radiation shielding fine particles 0.87)
b = Solar radiation shielding fine particles masterbatch
c = Twin-screw extruder T-die/Extrusion molding
d = Sheet 10 cm × 5 cm × thickness 2.0 mm
e = Short-screw extruder T-die/Extrusion molding
f = Cap layer/Solar radiation shielding resin formed body/Cap layer

TABLE 3

| | | Optical properties | | | | |
|---|---|---|---|---|---|---|
| | | a (nm) | b (%) | c (%) | Haze (%) | d (%) |
| Example 1 | Dispersion body A3 | 1233 | 56.2 | 32.4 | 1.4 | 1.4 |
| Example 2 | Dispersion body B3 | Same as above | 61.9 | 38.3 | 1.6 | 1.6 |
| Example 3 | Dispersion body C3 | 1515 | 58.4 | 38.8 | 1.8 | 0.3 |
| Example 4 | Dispersion body C3 | Same as above | 55.3 | 34.6 | 2.1 | 0.3 |
| Example 5 | Dispersion body D3 | 1813 | 63.6 | 45.5 | 1.5 | 2.4 |
| Example 6 | Dispersion body E3 | Same as above | 60.1 | 43.2 | 1.7 | 0.4 |
| Comparative Example 1 | Dispersion body F3 | 1078 | 51.4 | 38.6 | 2.0 | 1.7 |
| Comparative Example 2 | Dispersion body G3 | 2870 | 71.8 | 65.1 | 2.1 | 2.4 | a = Wavelength of valley exhibiting strong absorption in transmission profile
b = Visible light transmittance
c = Solar radiation transmittance
d = Visible light transmittance difference before and after loading after 500 hours with weatherometer

DESCRIPTION OF REFERENCE NUMERALS

11 Boron atom
12 Element M
21 Thermal plasma
22 High frequency coil
23 Sheath gas supply nozzle
24 Plasma gas supply nozzle
25 Raw material powder supply nozzle
26 Reaction vessel
27 Suction tube
28 Filter

What is claimed is:

1. A liquid solar radiation shielding fine particle dispersion body, comprising:
a mixture of at least one selected from an organic solvent and
a plasticizer, and solar radiation shielding fine particles, which are dispersed therein, or
a solar radiation shielding fine particle dispersion body, comprising:
a powder solar radiation shielding fine particle dispersion material, which is obtained by removing a liquid component from the solar radiation fine particle dispersion body with heating, and dispersed in a resin component,
wherein the solar radiation shielding fine particles are solar radiation shielding fine particles containing calcium lanthanum boride fine particles represented by general formula $Ca_xLa_{1-x}B_m$, value of x is in a range of $0.001 \leq x \leq 0.800$, and a value of m is in a range of $5.0 \leq m < 6.3$ in the general formula, an average dispersed particle size is 1 nm or more and 800 nm or less,
a fine particle shape of the calcium lanthanum boride fine particles is at least one shape selected from the following 1) and 2):
1) A shape in which a scattering intensity of the calcium lanthanum boride fine particles diluted and dispersed in a solvent measured using a small-angle X-ray scattering method is such that a slope value Ve of a straight line obtained by double-logarithmic plotting of a relationship between scattering vector $q=4\pi \sin \theta/\lambda$ and scattering intensity $I(q)$ is in a range of $-3.8 \leq Ve \leq -1.5$;

2) a flat cylindrical shape, wherein a diameter of a bottom circle is d and a height of a cylinder is h, or a spheroidal shape, wherein a length of a long axis is d and a length of a short axis is h, with a value of aspect ratio d/h being in a range of $1.5 \leq d/h \leq 20$.

2. The solar radiation shielding fine particles according to claim 1,
wherein a value of x in the general formula is $0.100 \leq x \leq 0.625$, and a value of m is $5.0 \leq m < 6.3$.

3. The solar radiation shielding fine particle dispersion body according to claim 1,
which is a mixture comprising of two or more kinds of calcium lanthanum boride fine particles having different values of x in the general formula.

4. The solar radiation shielding fine particle dispersion body according to claim 1,
wherein the solar radiation shielding fine particle dispersion body contains a polymeric dispersant.

5. The solar radiation shielding fine particle dispersion body according to claim 4,
wherein the mixing ratio of the solar radiation shielding fine particles and the polymeric dispersant is 0.3 parts by mass or more and less than 20 parts by mass of the polymeric dispersant with respect to 1 part by mass of the solar radiation shielding fine particles.

6. The solar radiation shielding fine particle dispersion body according to claim 1,
wherein the solar radiation shielding fine particles has a surface covering layer containing at least one selected from a silicon compound, a titanium compound, a zirconium compound, and an aluminum compound.

7. A solar radiation shielding fine particle-containing masterbatch comprising:
the solar radiation shielding fine particle dispersion body according to claim 1 and
a thermoplastic resin obtained by kneading,
wherein the solar radiation shielding fine particles are uniformly dispersed in the thermoplastic resin.

8. The solar radiation shielding fine particle-containing masterbatch according to claim 7,
wherein the content of the solar radiation shielding fine particles to the thermoplastic resin is 0.01 parts by mass or more and 20 parts by mass or less of the solar radiation shielding fine particles with respect to 100 parts by mass of the thermoplastic resin.

9. The solar radiation shielding fine particle-containing masterbatch according to claim 7,
wherein the thermoplastic resin is one selected from a resin group including polycarbonate resin, (meth) acrylic resin, polyether imide resin, polyester resin, polystyrene resin, (meth)acrylic-styrene copolymer (MS resin), polyether sulfone resin, fluorine-based resin, vinyl resin, and polyolefin resin, or a mixture of two or more resins selected from the resin group, or a copolymer of two or more resins selected from the resin group.

10. A solar radiation shielding resin formed body, comprising:
the solar radiation shielding fine particle-containing masterbatch according to claim 7, and
a forming material including a thermoplastic resin of the same kind as that contained in the solar radiation shielding fine particle-containing masterbatch, and/or a forming material including a different kind of a thermoplastic resin having compatibility,
which is formed into a predetermined shape.

11. The solar radiation shielding resin formed body according to claim 10,
the shape of which is flat or three-dimensional.

12. The solar radiation shielding resin laminate comprising the solar radiation shielding resin formed body according to claim 10, stacked on another transparent formed body.

13. A method for producing a solar radiation shielding fine particle dispersion body that is
a liquid solar radiation shielding fine particle dispersion body, comprising: a mixing of at least one selected from an organic solvent and a plasticizer, and solar radiation shielding fine particles, which are dispersed therein, or
a powder solar radiation shielding fine particle dispersion material, which is obtained by removing a liquid component from the solar radiation fine particle dispersion body with heating, and dispersed in a resin component,
wherein the solar radiation shielding fine particles are solar radiation shielding fine particles containing calcium lanthanum boride fine particles represented by general formula $Ca_xLa_{1-x}B_m$, a value of x is in a range of $0.001 \leq x \leq 0.800$, and a value of m is in a range of $5.0 < m < 6.3$ in the general formula, an average dispersed particle size is 1 nm or more and 800 nm or less,
a fine particle shape of the calcium lanthanum boride fine particles is at least one shape selected from the following 1) and 2):
1) A shape in which a scattering intensity of the calcium lanthanum boride fine particles diluted and dispersed in a solvent measured using a small-angle X-ray scattering method is such that a slope value Ve of a straight line obtained by double-logarithmic plotting of a relationship between scattering vector $q=4\pi \sin \theta/\lambda$ and scattering intensity $I(q)$ is in a range of $-3.8 \leq Ve \leq -1.5$;
2) a flat cylindrical shape, wherein a diameter of a bottom circle is d and a height of a cylinder is h, or a spheroidal shape, wherein a length of a long axis is d and a length of a short axis is h, with a value of aspect ratio d/h being in a range of $1.5 \leq d/h \leq 20$.

* * * * *